US012626431B2

(12) United States Patent
Li et al.

(10) Patent No.: US 12,626,431 B2
(45) Date of Patent: May 12, 2026

(54) UTILIZING MACHINE LEARNING MODELS TO GENERATE IMAGE EDITING DIRECTIONS IN A LATENT SPACE

(71) Applicant: Adobe Inc., San Jose, CA (US)

(72) Inventors: Yijun Li, Seattle, WA (US); Richard Zhang, San Francisco, CA (US); Krishna Kumar Singh, San Jose, CA (US); Jingwan Lu, Santa Clara, CA (US); Gaurav Parmar, Pittsburgh, PA (US); Jun-Yan Zhu, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 98 days.

(21) Appl. No.: 18/178,167

(22) Filed: Mar. 3, 2023

(65) Prior Publication Data

US 2024/0296607 A1      Sep. 5, 2024

(51) Int. Cl.
*G06T 11/60*          (2006.01)
*G06F 40/56*          (2020.01)
(Continued)

(52) U.S. Cl.
CPC ............. *G06T 11/60* (2013.01); *G06F 40/56* (2020.01); *G06T 1/0021* (2013.01); *G06T 5/70* (2024.01); *G06V 10/44* (2022.01); *G06V 10/82* (2022.01); *G06V 20/70* (2022.01); *G06T 2207/20182* (2013.01)

(58) Field of Classification Search
None
See application file for complete search history.

(56) References Cited

U.S. PATENT DOCUMENTS 10,552,968 B1 *   2/2020   Wang .................... G06T 7/33
11,693,637 B1 *   7/2023   Singh .................... G06F 8/436
                                                    717/139
(Continued)

FOREIGN PATENT DOCUMENTS

CN          113160084 B        7/2022

OTHER PUBLICATIONS

Brooks, Tim, Aleksander Holynski, and Alexei A. Efros, "InstructPix2Pix: Learning to Follow Image Editing Instructions." arXiv preprint arXiv:2211.09800 (2022) (Year: 2022).*
(Continued)

*Primary Examiner* — Nurun Flora
(74) *Attorney, Agent, or Firm* — Keller Preece PLLC

(57)          ABSTRACT

The present disclosure relates to systems, non-transitory computer-readable media, and methods for utilizing machine learning models to generate modified digital images. In particular, in some embodiments, the disclosed systems generate image editing directions between textual identifiers of two visual features utilizing a language prediction machine learning model and a text encoder. In some embodiments, the disclosed systems generated an inversion of a digital image utilizing a regularized inversion model to guide forward diffusion of the digital image. In some embodiments, the disclosed systems utilize cross-attention guidance to preserve structural details of a source digital image when generating a modified digital image with a diffusion neural network.

20 Claims, 18 Drawing Sheets

(51) Int. Cl.

| | |
|---|---|
| *G06T 1/00* | (2006.01) |
| *G06T 5/70* | (2024.01) |
| *G06V 10/44* | (2022.01) |
| *G06V 10/82* | (2022.01) |
| *G06V 20/70* | (2022.01) |

(56) References Cited

U.S. PATENT DOCUMENTS

| | | | | |
|---|---|---|---|---|
| 11,978,141 | B2 | 5/2024 | Saharia et al. | |
| 11,995,803 | B1 | 5/2024 | Karpman et al. | |
| 2016/0232142 | A1* | 8/2016 | Melnikov | G06F 40/253 |
| 2021/0264203 | A1* | 8/2021 | Fuxman | G06F 18/24 |
| 2023/0185540 | A1* | 6/2023 | Srivastava | G06N 3/094 |
| | | | | 717/106 |
| 2023/0377226 | A1 | 11/2023 | Saharia et al. | |
| 2024/0119862 | A1* | 4/2024 | Zheng | G10L 25/18 |
| 2024/0135509 | A1 | 4/2024 | Liu et al. | |
| 2024/0161369 | A1 | 5/2024 | Li et al. | |
| 2024/0185035 | A1 | 6/2024 | Yu et al. | |
| 2024/0265690 | A1 | 8/2024 | Anandkumar et al. | |
| 2024/0282131 | A1 | 8/2024 | Ren et al. | |
| 2024/0338799 | A1 | 10/2024 | Li et al. | |

OTHER PUBLICATIONS

Yu, Yingchen, et al. "Towards counterfactual Image manipulation via clip." Proceedings of the 30th ACM International Conference on Multimedia. 2022 (Year: 2022).*

Aditya Ramesh, Mikhail Pavlov, Gabriel Goh, Scott Gray, Chelsea Voss, Alec Radford, Mark Chen, and Ilya Sutskever. Zero-shot text-to-image generation. arXiv preprint arXiv:2102.12092, 2021.

Aditya Ramesh, Prafulla Dhariwal, Alex Nichol, Casey Chu, and Mark Chen. Hierarchical text-conditional image generation with clip latents. arXiv preprint arXiv:2204.06125, 2022.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language super-vision. In International Conference on Machine Learning, pp. 8748-8763. PMLR, 2021.

Alex Nichol, Prafulla Dhariwal, Aditya Ramesh, Pranav Shyam, Pamela Mishkin, Bob McGrew, Ilya Sutskever, and Mark Chen. Glide: Towards photorealistic image generation and editing with text-guided diffusion models. arXiv preprint arXiv:2112.10741, 2021.

Amir Hertz, Ron Mokady, Jay Tenenbaum, Kfir Aberman, Yael Pritch, and Daniel Cohen-Or. Prompt-to-prompt image editing with cross attention control. arXiv preprint arXiv:2208.01626, 2022.

Ashish Vaswani, Noam Shazeer, Niki Parmar, Jakob Uszkoreit, Llion Jones, Aidan N Gomez, Lukasz Kaiser, and Illia Polosukhin. Attention is all you need. In NeurIPS, 2017.

Bahjat Kawar, Shiran Zada, Oran Lang, Omer Tov, Huiwen Chang, Tali Dekel, Inbar Mosseri, and Michal Irani. Imagic: Text-based real image editing with diffusion models. arXiv preprint arXiv:2210.09276, 2022.

Chenlin Meng, Yang Song, Jiaming Song, Jiajun Wu, Jun-Yan Zhu, and Stefano Ermon. Sdedit: Image synthesis and editing with stochastic differential equations. arXiv preprint arXiv:2108.01073, 2021.

Chitwan Saharia, William Chan, Saurabh Saxena, Lala Li, Jay Whang, Emily Denton, Seyed Kamyar Seyed Ghasemipour, Burcu Karagol Ayan, S Sara Mahdavi, Rapha Gontijo Lopes, et al. Photorealistic text-to-image diffusion models with deep language understanding. arXiv preprint arXiv:2205.11487, 2022.

Daniel Roich, Ron Mokady, Amit H Bermano, and Daniel Cohen-Or. Pivotal tuning for latent-based editing of real images. arXiv preprint arXiv:2106.05744, 2021.

David Bau, Hendrik Strobelt, William Peebles, Jonas Wulff, Bolei Zhou, Jun-Yan Zhu, and Antonio Torralba. Semantic photo manipulation with a generative image prior. 38(4):1-11, 2019.

Diederik P Kingma and Max Welling. Auto-encoding variational bayes. In ICLR, 2014.

Dzmitry Bahdanau, Kyunghyun Cho, and Yoshua Bengio. Neural machine translation by jointly learning to align and translate. arXiv preprint arXiv:1409.0473, 2014.

Elad Richardson, Yuval Alaluf, Or Patashnik, Yotam Nitzan, Yaniv Azar, Stav Shapiro, and Daniel Cohen-Or. Encoding in style—a stylegan encoder for image-to-image translation. arXiv preprint arXiv:2008.00951, 2020.

Erik Harkonen, Aaron Hertzmann, Jaakko Lehtinen, and Sylvain Paris. Ganspace: Discovering interpretable gan controls. In NeurIPS, 2020.

Gaurav Parmar, Yijun Li, Jingwan Lu, Richard Zhang, Jun-948 Yan Zhu, and Krishna Kumar Sing. Spatially-adaptive multi-layer selection for gan inversion and editing. In Proceedings of the IEEE/CVF Conference on Computer Vision and Pattern Recognition, 2022.

Gwanghyun Kim, Taesung Kwon, and Jong Chul Ye. Diffusionclip: Text-guided diffusion models for robust image manipulation. In Proceedings of the IEEE/CVF Conference on Computer Vision and Pattern Recognition (CVPR), pp. 2426-2435, Jun. 2022.

Jack Hessel, Ari Holtzman, Maxwell Forbes, Ronan Le Bras, and Yejin Choi. CLIPScore: a reference-free evaluation metric for image captioning. In EMNLP, 2021.

Jiahui Yu, Yuanzhong Xu, Jing Yu Koh, Thang Luong, Gunjan Baid, Zirui Wang, Vijay Vasudevan, Alexander Ku, Yin-fei Yang, Burcu Karagol Ayan, et al. Scaling autoregressive models for content-rich text-to-image generation. arXiv preprint arXiv:2206.10789, 2022.

Jiaming Song, Chenlin Meng, and Stefano Ermon. Denoising diffusion implicit models. In ICLR, 2021.

Jiapeng Zhu, Yujun Shen, Deli Zhao, and Bolei Zhou. In-domain gan inversion for real image editing. In ECCV, 2020.

Jinjin Gu, Yujun Shen, and Bolei Zhou. Image processing using multi-code gan prior. In CVPR, 2020.

John A Gubner. Probability and random processes for electrical and computer engineers. Cambridge University Press, 2006.

Jonas Wulff and Antonio Torralba. Improving inversion and generation diversity in stylegan using a gaussianized latent space. arXiv preprint arXiv:2009.06529, 2020.

Jonathan Ho and Tim Salimans. Classifier-free diffusion guidance. arXiv preprint arXiv:2207.12598, 2022.

Jonathan Ho, Ajay Jain, and Pieter Abbeel. Denoising diffusion probabilistic models. In NeurIPS, 2020.

Jooyoung Choi, Sungwon Kim, Yonghyun Jeong, Youngjune Gwon, and Sungroh Yoon. Ilvr: Conditioning method for denoising diffusion probabilistic models. arXiv preprint arXiv:2108.02938, 2021.

Jun-Yan Zhu, Philipp Krahenbuhl, Eli Shechtman, and Alexei A Efros. Generative visual manipulation on the natural image manifold. In ECCV, 2016.

Junnan Li, Dongxu Li, Caiming Xiong, and Steven Hoi. Blip: Bootstrapping language-image pre-training for unified vision-language understanding and generation. In ICML, 2022.

Lakshmanan Nataraj, Tajuddin Manhar Mohammed, BS Manjunath, Shivkumar Chandrasekaran, Arjuna Flenner, Jawadul H Bappy, and Amit K Roy-Chowdhury. Detecting gan generated fake images using co-occurrence matrices. Electronic Imaging, 2019.

Ming Ding, Zhuoyi Yang, Wenyi Hong, Wendi Zheng, Chang Zhou, Da Yin, Junyang Lin, Xu Zou, Zhou Shao, Hongxia Yang, et al. Cogview: Mastering text-to-image generation via transformers. Advances in Neural Information Processing Systems, 34:19822-19835, 2021.

Minyoung Huh, Richard Zhang, Jun-Yan Zhu, Sylvain Paris, and Aaron Hertzmann. Transforming and projecting images into class-conditional generative networks. In ECCV, 2020.

Omri Avrahami, Dani Lischinski, and Ohad Fried. Blended diffusion for text-driven editing of natural images. In Proceedings of the IEEE/CVF Conference on Computer Vision and Pattern Recognition, pp. 18208-18218, 2022.

Or Patashnik, Zongze Wu, Eli Shechtman, Daniel Cohen-Or, and Dani Lischinski. Styleclip: Text-driven manipulation of stylegan imagery. In Proceedings of the IEEE/CVF International Conference on Computer Vision (ICCV), 2021.

(56) References Cited

OTHER PUBLICATIONS

Oran Gafni, Adam Polyak, Oron Ashual, Shelly Sheynin, Devi Parikh, and Yaniv Taigman. Make-a-scene: Scene-based text-to-image generation with human priors. arXiv preprint arXiv:2203. 13131, 2022.

Prafulla Dhariwal and Alexander Nichol. Diffusion models beat gans on image synthesis. Advances in Neural Information Processing Systems, 34:8780-8794, 2021.

Rameen Abdal, Peihao Zhu, John Femiani, Niloy Mitra, and Peter Wonka. Clip2stylegan: Unsupervised extraction of stylegan edit directions. In ACM SIGGRAPH 2022 Conference Proceedings, SIGGRAPH '22, New York, NY, USA, 2022. Association for Computing Machinery.

Rameen Abdal, Yipeng Qin, and Peter Wonka. age2stylegan: How to embed images into the stylegan latent space? In ICCV, 2019.

Rameen Abdal, Yipeng Qin, and Peter Wonka. age2stylegan++: How to edit the embedded images? CVPR, 2020.

Richard Zhang, Phillip Isola, Alexei A Efros, Eli Shechtman, and Oliver Wang. The unreasonable effectiveness of deep features as a perceptual metric. In CVPR, 2018.

Robin Rombach, Andreas Blattmann, Dominik Lorenz, Patrick Esser, and Bjorn Ommer. High-resolution image synthesis with latent diffusion models. In Proceedings of the IEEE/CVF Conference on Computer Vision and Pattern Recognition, pp. 10684-10695, 2022.

Robin Rombach, Andreas Blattmann, Dominik Lorenz, Patrick Esser, and Bjorn Ommer. Stable Diffusion. https://github.com/CompsVis/stable-diffusion, 2022.

Romain Beaumont. clip-retrieval. https://github.com/rom1504/clip-retrieval, 2022.

Sheng-Yu Wang, Oliver Wang, Richard Zhang, Andrew Owens, and Alexei A Efros. Cnn-generated images are surprisingly easy to spot . . . for now. In CVPR, 2020.

Shengyu Zhao, Jonathan Cui, Yilun Sheng, Yue Dong, Xiao Liang, Eric I Chang, and Yan Xu. Large scale image completion via co-modulated generative adversarial networks. In ICLR, 2021.

Tero Karras, Samuli Laine, Miika Aittala, Janne Hellsten, Jaakko Lehtinen, and Timo Aila. Analyzing and improving he image quality of stylegan. In CVPR, 2020.

Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. Language models are few-shot learners. Advances in neural in-formation processing systems, 33:1877-1901, 2020.

Xingang Pan, Xiaohang Zhan, Bo Dai, Dahua Lin, Chen Change Loy, and Ping Luo. Exploiting deep generative prior for versatile image restoration and manipulation. IEEE TPAMI, 2021.

Xingyi Zhou, Rohit Girdhar, Armand Joulin, Philipp Krahenbuhl, and Ishan Misra. Detecting twenty-thousand classes using image-level supervision. In ECCV, 2022.

Yang Song, Jascha Sohl-Dickstein, Diederik P Kingma, Abhishek Kumar, Stefano Ermon, and Ben Poole. Score-based generative modeling through stochastic differential equations. arXiv preprint arXiv:2011.13456, 2020.

Yujun Shen, Ceyuan Yang, Xiaoou Tang, and Bolei Zhou. Interfacegan: Interpreting the disentangled face representation learned by gans. IEEE TPAMI, 2020.

Zongze Wu, Dani Lischinski, and Eli Shechtman. Stylespace analysis: Disentangled controls for stylegan image generation. In CVPR, 2021.

Bo Zhang et al. "Spatial Transformation for Image Composition via Correspondence Learning." arXiv preprint arXiv:2207.02398 (2022).

Chao Jai et al. "Scaling up visual and vision-language representation learning with noisy text supervision." International conference on machine learning. PM LR, 2021.

Ethan Cooper. "Prompt-Free Image-to-Image and Synthesizing Time Lapse Videos of Paintings." (Apr. 2022).

Guillaume Couairon, et al. "DiffEdit: Diffusion-based semantic image editing with mask guidance." arXiv preprint arXiv:2210. 11427 (2022).

Yogesh Balaji, et al. "eDiff-I: Text-to-image diffusion models with an ensemble of expert denoisers." arXiv preprint arXiv:2211.01324 (2022).

U.S. Appl. No. 18/178,194, Dec. 19, 2024, Office Action.

U.S. Appl. No. 18/178,194, Mar. 12, 2025, Notice of Allowance.

Jeanneret, et al., "Diffusion Models for Counterfactual Explanations", arXiv:2203.15636v1 [cs.CV] Mar. 29, 2022.

Parmar et al., "Zero-shot Image-to-Image Translation", arXiv:2302. 03027v1 [cs.CV] Feb. 6, 2023.

U.S. Appl. No. 18/178,212, Jun. 6, 2025, Office Action.

U.S. Appl. No. 18/178,212, Sep. 3, 2025, Notice of Allowance.

* cited by examiner

| Method | cat → dog | | |
| --- | --- | --- | --- |
| | CLIP-Acc (↑) | BG Err (↓) | $S_{loss}$ (↓) |
| DDIM + word swap | 72.0% | 0.090 | 0.549 |
| SDEdit [22] + word swap | 70.0% | 0.106 | 0.541 |
| Prompt-to-prompt [14] | 36.4% | 0.020 | 0.684 |
| Ours | 95.6% | 0.045 | 0.644 |

Fig. 11

| Task Name | CLIP Acc (↑) | | $S_{loc}$ (↑) | |
|---|---|---|---|---|
| | w/o XA | w/ XA | w/o XA | w/ XA |
| cat → dog | 74.4 % | 95.6% | 0.574 | 0.644 |
| shirt → denim shirt | 67.0% | 71.0% | 0.12 | 0.43 |
| car → ferrari | 27.0% | 37.7% | 0.484 | 0.541 |

*Fig. 12*

Computing Device *1402*

Digital Graphics System *104*

Image Modification System *106*

Digital Image Manager *1404*

Machine Learning Model Manager *1406*

Data Storage Manager *1408*

Generative Neural Network *1410*

Regularized Inversion Model *1412*

Cross-Attention Guidance Model *1414*

Edit Direction Generation Model *1416*

1500

Generating A Noise Map From A Source Digital Image *1502*

Generating A Shifted Noise Map From The Noise Map *1504*

Comparing The Noise Map And The Shifted Noise Map *1506*

Generating A Modified Noise Map *1508*

1600

Generating A First Plurality Of Phrases For A Textual Identifier *1602*

Generating A Second Plurality Of Phrases For A Second Textual Identifier *1604*

Generating Embeddings Of The First And Second Plurality Of Phrases *1606*

Determining An Image Editing Direction By Comparing The Embeddings *1608*

Generating A Reference Cross-Attention Map For An Intermediate Image Reconstruction Prediction *1702*

Generating An Editing Cross-Attention Map For An Intermediate Edited Image Prediction *1704*

Generating A Modified Digital Image By Comparing The Reference Cross-Attention Map And The Editing Cross-Attention Map *1706*

UTILIZING MACHINE LEARNING MODELS TO GENERATE IMAGE EDITING DIRECTIONS IN A LATENT SPACE

BACKGROUND

Recent years have seen significant improvements in hardware and software platforms for digital image processing and editing. For example, conventional systems have leveraged recent computing advancements to modify digital images utilizing a variety of digital tools and models. To illustrate, conventional systems utilize large-scale text-to-image generative models to synthesize digital images. Despite these advancements, however, conventional systems continue to suffer from a number of technical deficiencies, particularly with regard to accuracy, efficiency, and flexibility in generating and modifying digital images.

BRIEF SUMMARY

Embodiments of the present disclosure provide benefits and/or solve one or more of the foregoing or other problems in the art with systems, non-transitory computer-readable media, and methods for utilizing machine learning models to modify digital images. For example, in some embodiments, the disclosed systems utilize a regularized inversion model to increase the accuracy of inverted (embedded) digital images, improve the efficiency and flexibility of introducing modifications to inverted digital images, and thus increase the fidelity of modified digital images upon image reconstruction. Further, in some embodiments, the disclosed systems utilize an edit direction generation model to determine image editing directions between two visual features within an embedded space. Moreover, in some embodiments, the disclosed systems utilize a cross-attention guidance model to preserve structural details of digital images when generating modified digital images with a diffusion neural network.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 10-13 illustrate comparative experimental results for an image modification system in accordance with one or more embodiments.

DETAILED DESCRIPTION

Figure 1:
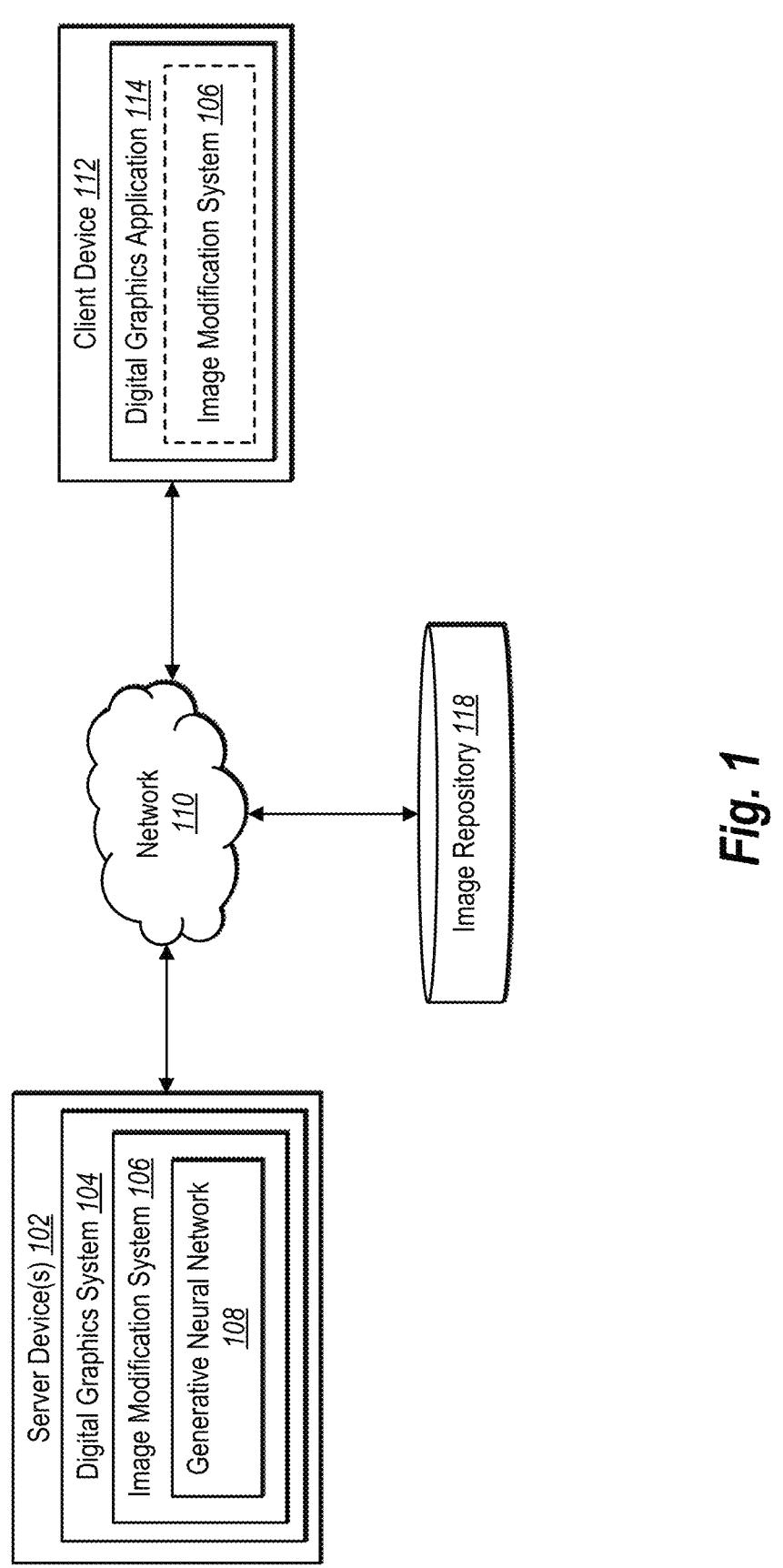
FIG. 1 illustrates a diagram of an environment in which an image modification system can operate in accordance with one or more embodiments.

This disclosure describes one or more embodiments of an image modification system that utilizes machine learning models to modify digital images. In particular, in one or more embodiments, the image modification system utilizes one or more of an edit direction generation model, a regularized inversion model, or a cross-attention guidance model as part of a generative machine learning approach to incorporate one or more edits into an embedded image space and generate a modified digital image.

In some embodiments, for instance, the image modification system utilizes an edit direction generation model to determine an image editing direction between a source visual feature portrayed within a source digital image and a target visual feature. In some implementations, for example, the image modification system implements the image editing direction within an embedded space to change the source visual feature portrayed by the source digital image to the target visual feature in a modified digital image. In some embodiments, the image modification system utilizes a language prediction machine learning model to generate two sets of phrases for two visual features, utilizes a text encoder to embed the two sets of phrases, and compares the two embedded sets of phrases to determine an image editing direction between the two visual features.

Moreover, in some embodiments, the image modification system utilizes a regularized inversion model to generate an inversion of a digital image with auto-correlation regularization. In particular, in one or more embodiments the image modification system utilizes auto-correlation regularization during forward diffusion of a digital image to improve inversion accuracy and fidelity, and thus reduce artifacts upon reconstruction of the digital image with a generative neural network. For example, in one or more embodiments, the image modification system generates a noise map from a digital image, shifts the noise map to generate a shifted noise map, and compares the noise map with the shifted noise map to determine a pairwise correlation loss. Also, in some embodiments, the image modification system compares the noise map of the digital image with a standard distribution to determine a divergence loss. Further, in some embodiments, the image modification system adjusts the noise map utilizing an auto-correlation loss that includes the divergence loss and/or the pairwise correlation loss.

Furthermore, in some embodiments, the image modification system utilizes a cross-attention guidance model to preserve details of a source digital image when generating a modified digital image with a generative neural network, such as a diffusion neural network. For instance, in one or more embodiments, the image modification system compares reference and editing cross-attention maps during denoising iterations of a diffusion neural network to encourage fidelity of the editing cross-attention maps with the reference cross-attention maps. In some embodiments, the image modification system generates the reference cross-attention maps between a reference encoding of the source digital image and intermediate image reconstruction predictions generated utilizing reconstruction denoising layers of the diffusion neural network. Further, in some embodiments, the image modification system generates the editing cross-attention maps between an image editing encoding and intermediate edited image predictions generated utilizing image editing denoising layers of the diffusion neural network. Moreover, in some embodiments, the image modification system generates a modified digital image, utilizing the diffusion neural network, by comparing the editing cross-attention maps and the reference cross-attention maps.

As mentioned above, conventional systems suffer from a number of technical deficiencies with regard to accuracy, efficiency, and flexibility of implementing computing devices. For example, conventional systems for machine learning based generation and modification of digital images often produce inaccurate results while modifying visual features of digital images. For instance, conventional systems oftentimes introduce variations or artifacts in other parts of a digital image while modifying the digital image to include a target visual feature. Indeed, many conventional systems produce modified digital images that are unusable due to such inaccuracies and poorly incorporated modifications.

In addition, conventional systems are also inflexible. For example, conventional systems are often rigid in that they are tied to a particular model architecture and approach. Thus, for example, conventional systems cannot operate with other models or incorporate improvements from other models as they progress. Moreover, because changes to a visual feature often result in unwanted changes to other content in the source digital image, many conventional models are inflexibly limited in available modifications due to effects on overall structure.

Furthermore, conventional systems are often inefficient. To illustrate, conventional systems often require extensive user input to determine and implement edits for digital images. For example, many conventional systems require a user to provide a detailed description of the source digital image and the proposed edit in order to determine an edit to a digital image that would allow an implementing model to adequately interpret and incorporate the proposed edit.

The image modification system provides many advantages and benefits over conventional systems and methods. For example, by utilizing an edit direction generation model to compare multiple phrases for source and target visual features in an embedded space, the image modification system generates robust image editing directions that accurately implement edits between visual features when incorporated by a generative neural network.

Moreover, by inverting digital images utilizing an auto-correlation regularization loss to implement a regularized forward diffusion process, the image modification system generates image inversions with improved accuracy over inversions produced by conventional systems. In particular, in some embodiments, the image modification system utilizes a regularized inversion model to guide forward diffusion of a source digital image towards a Gaussian noise distribution, thus reducing inaccuracies and resulting artifacts in digital images reconstructed from the inversion.

Furthermore, by utilizing cross-attention guidance to preserve content in modified digital images, the image modification system improves the accuracy and fidelity to structural details of source digital images when introducing modifications with a diffusion neural network. In particular, in some embodiments, by encouraging text-image cross-attention maps to be consistent before and after incorporating edits during inversion denoising, the image modification system produces modified digital images with increased accuracy and fidelity to unedited content of the source digital image, such as the overall structure of the image.

The depth refinement system also improves flexibility relative to conventional systems. Indeed, the image modification system is flexible in that it can generate accurate and robust image editing directions across a wide variety of visual features (e.g., cat to dog) and apply the image editing direction to a wide range of source digital images. Moreover, the image modification system can be deployed with a variety of different models or model architectures and flexibly incorporate improvements from other image generation models as they develop. Furthermore, the disclosed systems and methods can be implemented to improve a variety of generative neural networks by providing the forgoing improvements to various aspects of the image generation and modification process.

Furthermore, the image modification system exhibits increased efficiency relative to conventional systems and methods. For example, as mentioned above, conventional systems often require a user to provide a detailed description of the source digital image and/or a proposed edit in order to generate an image editing direction with sufficient detail to enable the generative neural network to adequately interpret and incorporate the proposed edit. In contrast, in some embodiments, the image modification system utilizes an edit direction generation model to generate robust image editing directions between visual features. In addition, in one or more embodiments, the image modification system utilizes predetermined image editing directions to modify a wide range of source digital images without the need to generate a unique image editing direction for each digital image.

Additional detail will now be provided in relation to illustrative figures portraying example embodiments and implementations of an image modification system. For example, FIG. 1 illustrates a system (or environment) in which an image modification system 106 operates in accordance with one or more embodiments. As illustrated, the system (or environment) includes server device(s) 102, a network 110, a client device 112, and an image repository 118. As further illustrated, the server device(s) 102, the client device 112, and the image repository 118 communicate with one another via the network 110.

As shown in FIG. 1, the server device(s) 102 include a digital graphics system 104 that further includes the image modification system 106. In some embodiments, the server device(s) include, but is not limited to, a computing device (such as explained below in reference to FIG. 14). In one or more embodiments, the image modification system 106 generates a modified digital image utilizing a generative neural network 108.

Also, the image modification system 106 can utilize a variety of machine learning models to perform a variety of image modification tasks, such as to determine image editing directions, to generate regularized inversions of digital images, and/or to generate modified digital images with cross-attention guidance (as further described in relation to FIG. 2 below). For example, a machine learning model includes a computer-implemented model trained and/or tuned based on inputs to approximate unknown functions. To illustrate, in one or more embodiments a machine learning model includes a computer algorithm with branches, weights, or parameters that are changed/learned based on training data to improve for a particular task. Thus, in one or more implementations a machine learning model utilizes one or more machine learning techniques (e.g., supervised or unsupervised learning) to improve in accuracy and/or effectiveness. Example machine learning models include various types of decision trees, support vector machines, Bayesian networks, random forest models, or neural networks (e.g., deep neural networks).

In one or more implementations, the models and/or networks described herein, such as the generative neural network 108, are implemented as neural networks. In particular, in some embodiments, a neural network includes a model of interconnected artificial neurons (e.g., organized in layers) that communicate and learn to approximate complex functions and generate outputs based on a plurality of inputs provided to the model. In some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, a multi-layer perceptron, or a diffusion neural network (e.g., as described below in relation to FIGS. 8-9). In some embodiments, a neural network includes a combination of neural networks or neural network components.

As just mentioned, in some embodiments, the image modification system 106 can utilize one or more generative machine learning models. A generative machine learning model includes machine learning models tuned or trained to generate pixels of a digital image. Thus, for example, a generative machine learning model includes generative adversarial neural networks (or GANs) that are trained in conjunction with discriminator neural networks (e.g., the GAN learns to generate digital images while the discriminator neural network learns to discriminate between real and generated digital images in a joint-training process). A generative neural network also includes a diffusion neural network.

As described in greater detail below, a diffusion neural network refers to a generative machine learning model that utilizes a diffusion and denoising process to generate a digital image. For example, a diffusion neural network can take a digital image representation and utilize diffusion layers to add noise to the digital image representation to generate a noise map or inversion (e.g., a representation of the digital image with added noise). The diffusion neural network can then utilize a neural network architecture (e.g., a plurality of denoising layers that remove noise or recreate a digital image) to generate a digital image from the noise map/inversion. In some implementations, the diffusion neural network utilizes a conditioning mechanism to conditions the denoising layers to add edits or modifications in generating a digital image from the noise map/inversion. For example, a conditioning mechanism can include a computer-implemented model (e.g., a conditioning encoder that utilizes a neural network encoding architecture) that generates or utilizes feature representations of desired changes or edits that are utilized by denoising layers to generate a modified digital image. For instance, a conditioning mechanism can utilize a conditioning encoder such as a vision-language machine learning model to generate an encoding that is utilize in denoising layers to generate a modified digital image. Thus, conditioning can include utilizing these feature representations (e.g., concatenating or combining feature representations with representations generated by the denoising layers) with the layers to generate a modified digital image. A diffusion neural network encompasses a variety of diffusion architectures, including a deterministic forward diffusion model or denoising diffusion implicit model as described in greater detail below.

Furthermore, as shown in FIG. 1, the system 100 includes the client device 112. In some embodiments, the client device 112 includes, but is not limited to, a mobile device (e.g., smartphone, tablet), a laptop computer, a desktop computer, or any other type of computing device, including those explained below in reference to FIG. 18. Although not shown in FIG. 1, some embodiments of client device 112 are operated by a user to perform a variety of functions via a digital graphics application 114 on client device 112. For example, the digital graphics application 114 includes one or more software applications (e.g., to interact with and/or modify digital images and/or three-dimensional models utilizing one or more machine learning models in accordance with one or more embodiments herein) installed on the client device 112. In certain instances, the digital graphics application 114 is hosted on the server device(s) 102. Additionally, when hosted on the server device(s) 102, the digital graphics application 114 is accessed by the client device 112 through a web browser and/or another online interfacing platform and/or tool.

Although FIG. 1 illustrates the image modification system 106 being implemented by a particular component and/or device within the system 100 (e.g., the server device(s) 102), in some embodiments the image modification system 106 is implemented, in whole or in part, by other computing devices and/or components in the system 100. For instance, in some embodiments, the image modification system 106 is implemented on the client device 112 (e.g., via the digital graphics application 114). More specifically, in one or more embodiments, the description of (and acts performed by) the image modification system 106 with regard to the server device(s) 102 are implemented (or performed) by the image modification system 106 on the client device 112. In particular, in some embodiments, the client device 112 (via an implementation of the image modification system 106) generates a modified digital image utilizing the generative neural network 108.

In some embodiments, the server device(s) 102 trains one or more machine learning models described herein. The image modification system 106 on the server device(s) 102 provides the one or more trained machine learning models to the client device 112 for implementation. In other words, the client device 112 obtains (e.g., downloads) the machine learning models from the server device(s) 102. At this point, the client device 112 may utilize the machine learning models to generate modified digital images. In one or more embodiments, the server device(s) 102 train and implement the machine learning models (e.g., and provide one or more modified digital images to the client device 112).

In some embodiments, the digital graphics application 114 includes a web hosting application that allows the client device 112 to interact with content and services hosted on the server device(s) 102. To illustrate, in one or more implementations, the client device 112 accesses a web page or computing application supported by the server device(s) 102. The client device 112 provides input to the server device(s) 102 (e.g., a digital image and/or user inputs). In response, the image modification system 106 on the server device(s) 102 performs operations described herein to generate a modified digital image. The server device(s) 102 then provides the output or results of the operations (e.g., a refined depth map for a digital image) to the client device 112.

As further shown in FIG. 1, the system 100 includes the image repository 118. In one or more embodiments, the image repository 118 includes, but is not limited to, a server device, a cloud service computing device, or any other type of computing device (including those explained below in reference to FIG. 18) that stores one or more digital images, and, in some embodiments, additional data associated with the one or more digital images, such as predetermined image editing directions. For example, the image modification system 106 utilizes images from the image repository 118 to generate embeddings/inversions of those images and/or modified versions of those images. In some instances, predetermined image editing directions (such as those generated in accordance with one or more embodiments described herein) are provided by the image repository 118 to the image modification system 106 for implementation by the generative neural network 108 to introduce edits (modifications) to digital images. In some instances, the image modification system 106 performs the above-mentioned tasks upon receiving a request from the client device 112 to utilize digital images (and in some implementations, predetermined image editing directions) from the image repository 118.

Additionally, as shown in FIG. 1, the system 100 includes the network 110. As mentioned above, in some instances, the network 110 enables communication between components of the system 100. In certain embodiments, the network 110 includes a suitable network and may communicate using any communication platforms and technologies suitable for transporting data and/or communication signals, examples of which are described with reference to FIG. 18. Furthermore, although FIG. 1 illustrates the server device(s) 102, the client device 112, and the image repository 118 communicating via the network 110, in certain embodiments, the various components of the system 100 communicate and/or interact via other methods (e.g., the server device(s) 102 and the client device 112 communicating directly).

As discussed above, in one or more embodiments, the image modification system 106 generates a modified digital image utilizing one or more machine learning models, including a generative neural network. For instance, FIG. 2 illustrates the image modification system 106 generating a modified digital image 212 utilizing a regularized inversion model 204, a cross-attention guidance model 206, and an edit direction generation model 208 in accordance with one or more embodiments.

Figure 2:
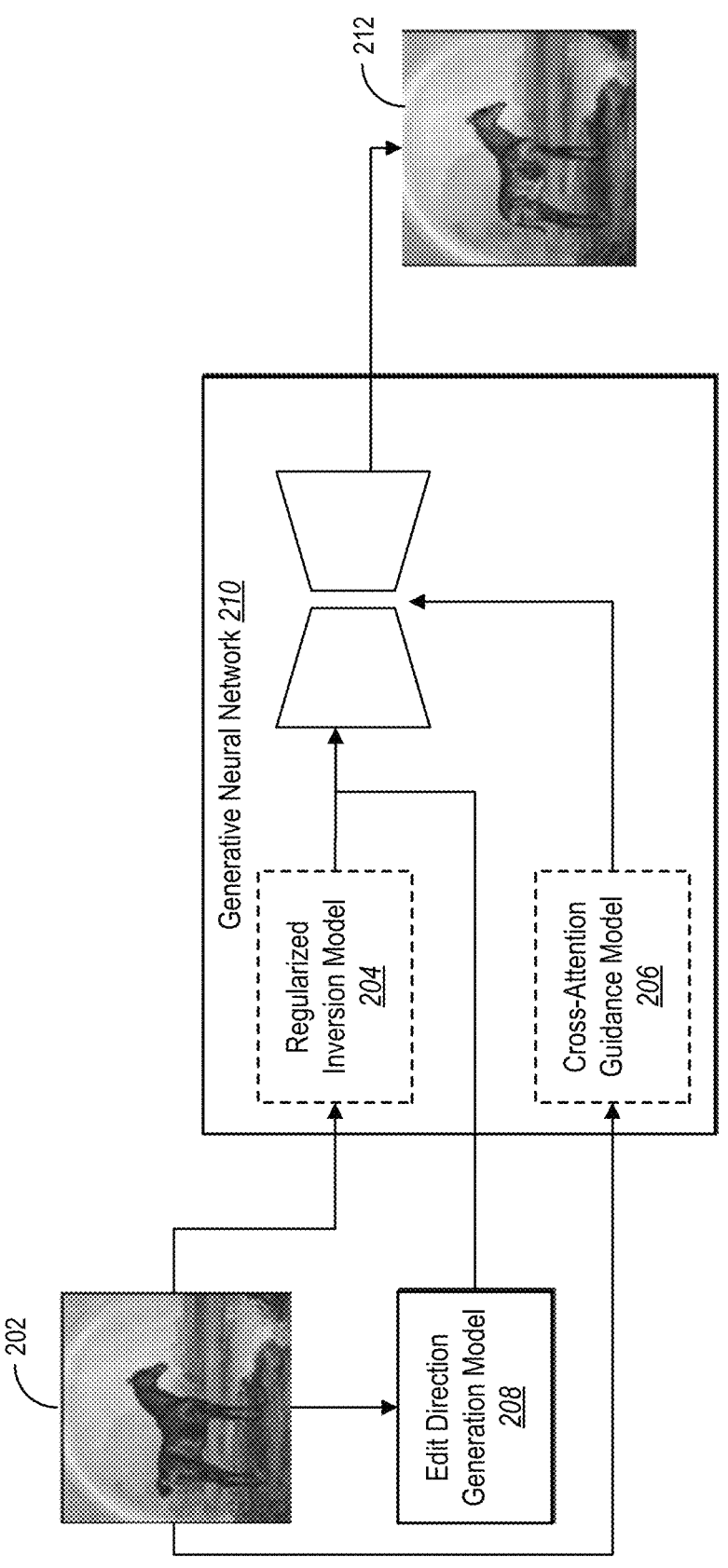
FIG. 2 illustrates an overview of an image modification system generating a modified digital image in accordance with one or more embodiments.

In particular, as shown in FIG. 2, the image modification system 106 identifies or receives a source digital image 202 depicting various visual features. For example, the source digital image 202 portrays a brown horse standing near a body of water. In some implementations, for example, the image modification system 106 captures a digital image (e.g., utilizing a camera device of a client device) and/or accesses a repository of digital images (e.g., a camera roll or cloud storage of digital images).

As illustrated, the image modification system 106 utilizes the edit direction generation model 208 to determine one or more image editing directions for modifying the source digital image 202. For example, in some implementations, the image modification system 106 utilizes the edit direction generation model 208 to determine image editing directions between one or more visual features of the source digital image 202 (e.g., the depicted horse, rainbow, or body of water) and one or more target visual features (e.g., a zebra, bridge, or field of grass). Other examples of editing directions include but are not limited to changes to the artistic style or medium of a source image (e.g., from a painting to a pencil sketch), changes to a general style, genre, or other attribute of a visual feature (e.g., from one breed of horse to another), and so forth.

In some implementations, the image modification system 106 utilizes the edit direction generation model 208 to generate one or more image editing directions in response to a user command, such as a natural language input indicating a requested modification to the source digital image 202. In other implementations, the image modification system 106 utilizes the edit direction generation model 208 to generate multiple predetermined image editing directions for predicted use cases. Relatedly, in some implementations, the image modification system 106 stores requested image editing directions for subsequent use (e.g., in future instances or by other users). Additional details of the edit direction generation model 208 are provided below in relation to FIG. 5.

As also shown in FIG. 2, the image modification system 106 utilizes the regularized inversion model 204 to generate an inversion of the source digital image 202 for input into the generative neural network 210. For example, in some implementations, the image modification system 106 maps the source digital image 202 into an embedded space utilizing the regularized inversion model 204 to generate an inversion with increased accuracy relative to inversions generated without regularization. Further details of the regularized inversion model 204 are provided below in relation to FIGS. 3-4.

Moreover, as shown in FIG. 2, the image modification system 106 utilizes the cross-attention guidance model 206 with the generative neural network 210 to preserve details (e.g., structural features) of the source digital image 202 within the resultant modified digital image 212. For example, the cross-attention guidance model 206 implements cross-attention guidance, based on a reference encoding of the source digital image 202, within one or more layers of the generative neural network 210 to introduce image edits while preserving unedited details of the source digital image 202 within the modified digital image 212. Further details of the cross-attention guidance model 206 are provided below in relation to FIGS. 6-8.

While FIG. 2 shows the image modification system 106 utilizing all of the foregoing models to generate the modified digital image 212, embodiments can optionally utilize any combination of the disclosed models and methods to invert, edit, and reconstruct digital images to generate modified digital images. In some implementations, for example, the image modification system 106 can utilize a predetermined image editing direction rather than determining an image editing direction with the edit direction generation model 208.

Figure 3:
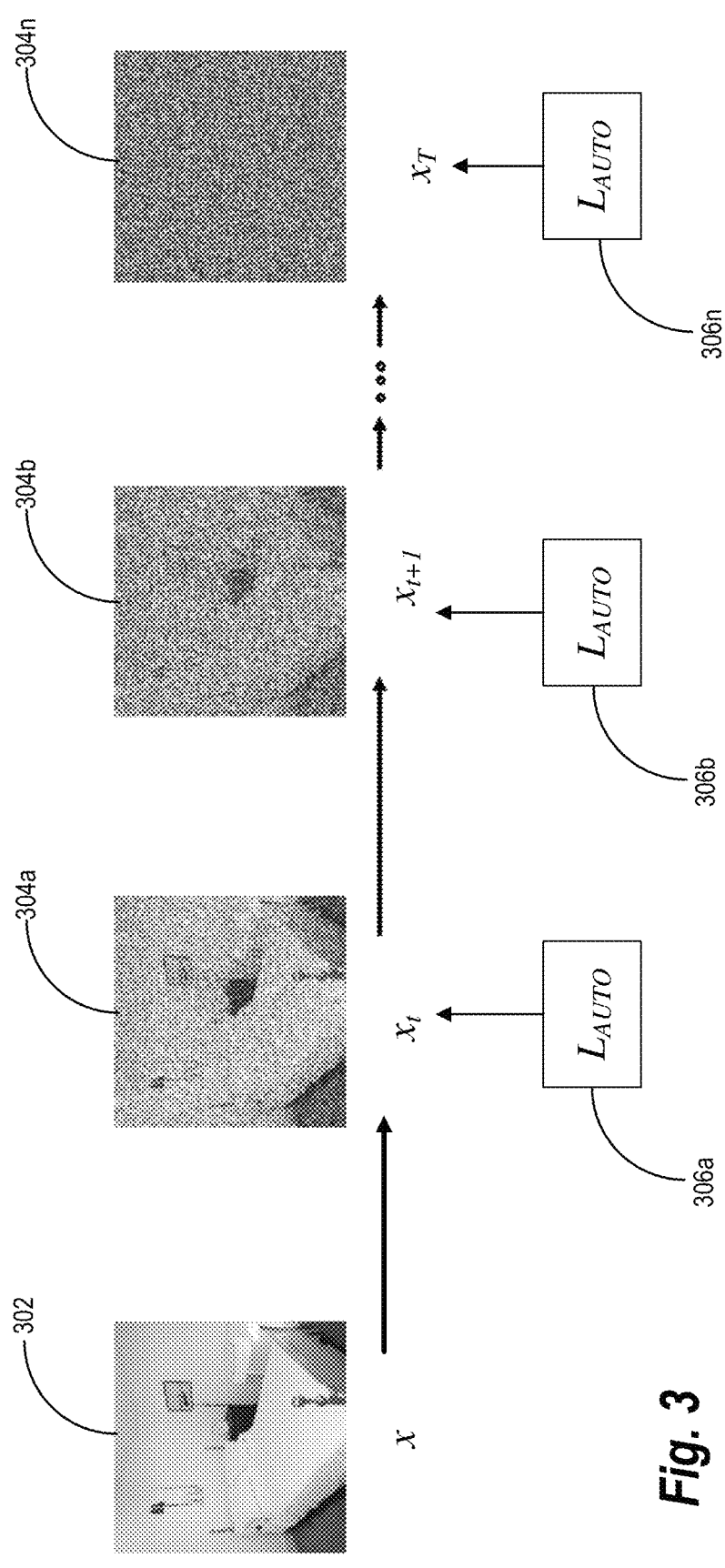
FIG. 3 illustrates an image modification system inverting a digital image utilizing regularized forward diffusion in accordance with one or more embodiments.

As mentioned above, in some embodiments, the image modification system 106 generates an inversion of a digital image utilizing a regularized inversion model. For example, FIG. 3 illustrates the image modification system 106 generating an inverted noise map 304n (i.e., an inversion) of a source digital image 302 utilizing a regularized inversion model. As particularly illustrated, the image modification system 106 guides each iteration of forward diffusion of the source digital image 302 with an auto-correlation regularization loss 306a-306n (represented as $\mathcal{L}_{AUTO}$ in FIGS. 3-4) to iteratively generate a plurality of subsequent noise maps from the source digital image 302.

As mentioned above, in some embodiments, the image modification system 106 utilizes elements of a diffusion model or diffusion neural network. A diffusion model refers to a machine learning model that destroys or diffuses data through successive addition of Gaussian noise and then learns to recover the data by reversing this noising process. For example, a diffusion model can include a latent variable model that maps a digital image to a latent space using a fixed Markov chain that adds noise to the data. The diffusion model utilizes a machine learning (e.g., neural network) architecture to learn to reverse this process, traversing backwards along the chain to generate new data. For example, in one or more embodiments, the image modification system 106 utilizes a Denoising Diffusion Probabilistic Model (DDPM) as described by J. Ho, et al. in *Denoising Diffusion Probabilistic Models*, arXiv:2006: 11239, which is incorporated by reference in its entirety herein.

Figure 4:
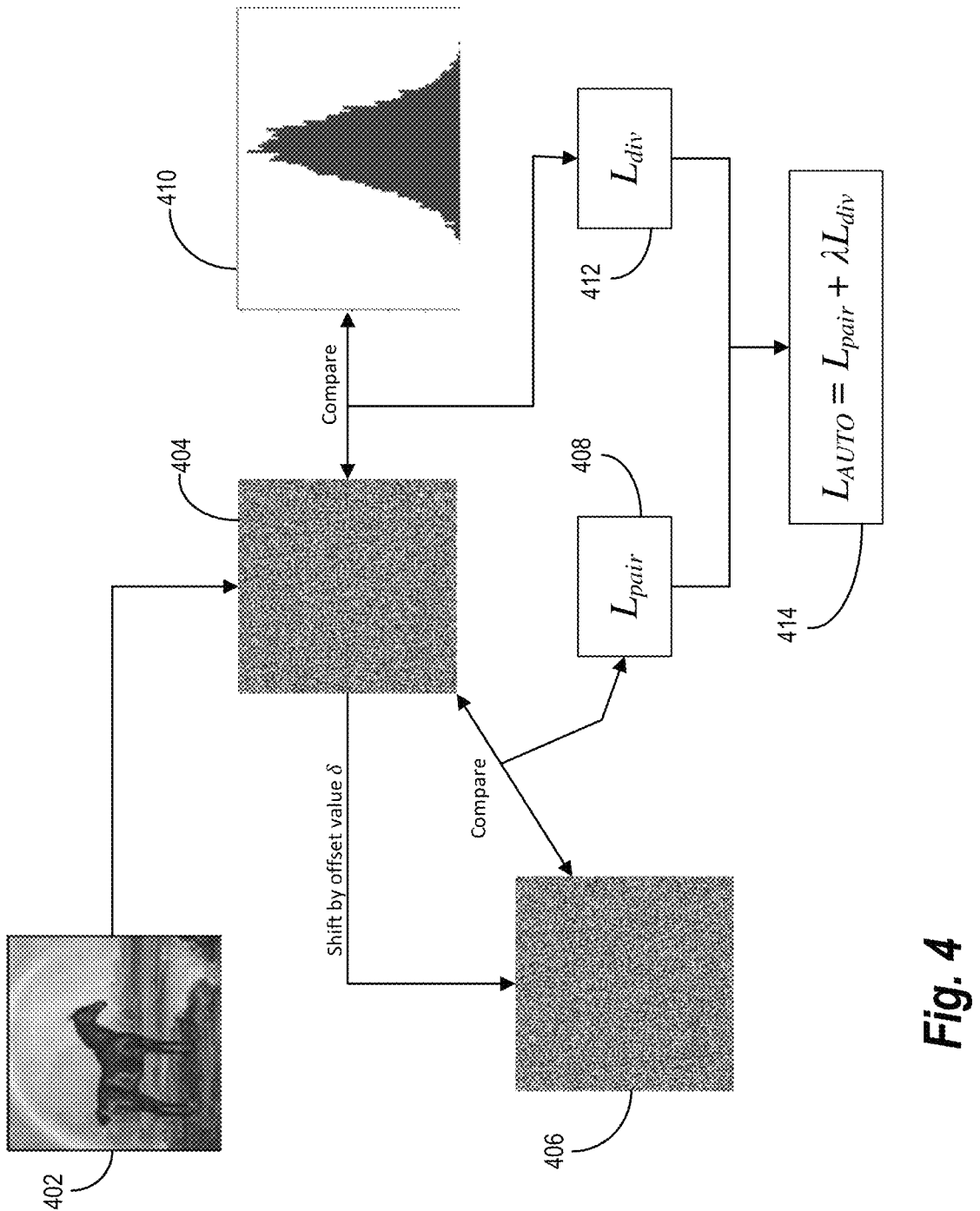
FIG. 4 illustrates an image modification system determining an auto-correlation regularization loss in accordance with one or more embodiments.

As particularly illustrated in FIGS. 3-4, the image modification system 106 utilizes a Denoising Diffusion Implicit Model (DDIM) to implement deterministic inversion and reconstruction of a digital image (or generation of a modified digital image) in accordance with one or more embodiments. For example, in one or more embodiments, the image modification system 106 implements one or more elements of a deterministic forward diffusion process of a DDIM to invert a digital image, such as described by Jiaming Song, et al. in *Denoising diffusion implicit models*. In *ICLR, 2021*, which is incorporated by reference in its entirety herein.

As shown in FIG. 3, the image modification system 106 identifies or receives a source digital image 302 depicting various visual features. For example, in one or more implementations, the image modification system 106 captures a digital image (e.g., utilizing a camera device of a client device), accesses a repository of digital images (e.g., a camera roll or cloud storage of digital images), and/or otherwise receives the source digital image 302 to be inverted and presumably modified or reconstructed from the resulting inversion. In one or more embodiments, rather than directly inverting the source digital image 302, the image modification system 106 inverts (i.e., generates the inverted noise map 304n) an initial latent vector corresponding to the source digital image (e.g., as further described below in relation to FIG. 9).

As illustrated in FIG. 3, the image modification system 106 gradually adds noise (e.g., Gaussian noise) to the source digital image 302 utilizing one or more of the forward diffusion processes discussed in connection to diffusion models above (i.e., DDPM or DDIM), until the signal of the source digital image 302 is destroyed or replaced with the inverted noise map 304n. While FIG. 3 illustrates forward diffusion by direct addition of noise to the source digital image 302, in some embodiments the image modification system 106 generates a latent vector from a digital image and performs forward diffusion of the latent vector (e.g., as described in further detail below in relation to FIG. 9).

The inverted noise maps generated by DDIM inversion often do not follow the statistical properties of uncorrelated, Gaussian white noise, causing poor editability. A Gaussian white noise map should have (1) no correlation between any pair of random locations and (2) zero-mean, unit-variance at each spatial location (which would be reflected in its auto-correlation function being a Kronecker delta function). Following this, the image modification system 106 guides the inversion process with an autocorrelation objective, comprised of a pairwise loss and a KL divergence term at individual pixel locations (e.g., a pairwise correlation loss and/or a divergence loss as described in greater detail in FIG. 4).

As shown in FIG. 3, the image modification system 106 utilizes the auto-correlation regularization loss 306a-306n at each iteration of forward diffusion to regularize the inversion (i.e., diffusion) or the previous iteration. For instance, the image modification system 106 generates a first intermediate noise map 304a (also represented as $x_t$) by adding noise to the source digital image 302. Also, the image modification system 106 determines and implements an auto-correlation loss 306a to encourage (i.e., regularize) the first intermediate noise map 304a towards a pure Gaussian white noise. In particular, in one or more embodiments, the image modification system 106 utilizes an auto-correlation loss to reduce a difference between a noise map (e.g., at each iteration) and a Gaussian distribution having no correlation between any pair of random locations and zero-mean, unit-variance at each spatial location.

Moreover, the image modification system 106 generates a subsequent intermediate noise map 304b (also represented as $x_{t+1}$) by adding noise to the first intermediate noise map 304a. Similar to the previous iteration, the image modification system 106 determines and implements an auto-correlation loss 306b to encourage (i.e., regularize) the intermediate noise map 304b towards a pure Gaussian white noise. As shown, the image modification system 106 gradually adds noise while regularizing each subsequent noise map utilizing the auto-correlation regularization loss 306n ($\mathcal{L}_{AUTO}$) until the source digital image 302 is completely replaced with noise, thus generating an inverted noise map 304n.

As mentioned above, in some embodiments, the image modification system 106 generates an inversion of a digital image utilizing a regularized inversion model to guide forward diffusion of the digital image with an auto-correlation regularization loss. For example, FIG. 4 illustrates the image modification system 106 determining an auto-correlation regularization loss 414 for a noise map 404 corresponding to a source digital image 402. The noise map 404, for example, corresponds to any of the noise maps shown and discussed in relation to FIG. 3 above.

As shown in FIG. 4, in some embodiments, the image modification system 106 determines the auto-correlation regularization loss 414 for the noise map 404 by determining one or more of a pairwise correlation loss 408 or a divergence loss 412. In some embodiments, the image modification system 106 combines the pairwise correlation loss 408 and the divergence loss 412 to determine the overall auto-correlation regularization loss 414 for the noise map 404.

As mentioned above, in some embodiments, the image modification system 106 utilizes a deterministic inversion model for forward diffusion, such as the DDIM architecture mentioned above, to generate an inversion (i.e., inverted noise map) of a digital image. For example, in some embodiments, the image modification system 106 introduces noise to the source digital image 402 based on a deterministic reverse diffusion (denoising) model as defined by:

$$x_{t+1} = \sqrt{\bar{\alpha}_{t+1}} \, f_\theta(x_t, t, c) + \sqrt{1 - \bar{\alpha}_{t+1}} \, \epsilon_\theta(x_t, t, \tau(c))$$

$$f_\theta(x_t, t, c) = \frac{x_t - \sqrt{1 - \bar{\alpha}_t} \, \epsilon_\theta(x_t, t, \tau(c))}{\sqrt{\bar{\alpha}_t}}$$

where $x_t$ is noised latent code at timestep t, $\epsilon_\theta(x_t, t, \tau(c))$ is a UNet based denoiser conditioned to predict added noise in $x_t$ on timestep t and encoded text (i.e., reference encoding) $\tau(c)$ by text encoder $\tau$, $\bar{\alpha}_t$ (and $\bar{\alpha}_{t+1}$) is a noise scaling factor, and $f_\theta(x_t, t, c)$ is the prediction of the final denoised latent code $x_0$. Additional description of the reverse diffusion model, according to one or more embodiments, is provided below in relation to FIG. 7.

As shown in FIG. 4, the image modification system 106 generates the noise map 404 by gradually adding noise to the source digital image 402 (or a latent vector generated by embedding the source digital image 402). In particular, FIG. 4 illustrates the image modification system 106 determining the auto-correlation regularization loss 414 for any noise map generated during forward diffusion (e.g., as describe above in relation to FIG. 3).

As illustrated, the image modification system 106 generates a shifted noise map 406 from the noise map 404 by shifting the noise map 404 by an offset value δ. In some embodiments, the image modification system 106 utilizes a randomized offset value δ, such that the image modification system 106 utilizes a different offset value δ at each iteration (i.e., timestep) of forward diffusion. By utilizing a random offset value δ throughout forward diffusion, the image modification system 106, in some embodiments, increases the effectiveness of regularization by propagating long-range information more efficiently. To determine the pairwise correlation loss 408, the image modification system 106 compares one or more regions of the noise map 404 and one or more regions of the shifted noise map 406. A region, for example, can include an area of a digital image, feature map, noise map, or inversion. For example, a region can include a pixel or a collection of pixels represented in a noise map from a digital image.

The image modification system 106 adjusts the noise map 404 according to the pairwise correlation loss 408 to reduce correlations (i.e., to reduce a similarity metric) between pairs of random locations (or regions) in the noise map 404 and the shifted noise map 406. To illustrate, a similarity metric can include a measure of relatedness, correlation, or similarity between two items/regions. In some implementations, the similarity metric includes an auto-correlation coefficient.

In some embodiments, the image modification system 106 reduces sampling of data pairs by forming a pyramid of noise data. For instance, in some embodiments, the image modification system 106 generates a pyramid of noise maps at different resolutions from the noise map 404 and a pyramid of shifted noise maps at different resolutions from the shifted noise map 406. In response, the image modification system 106 determines the pairwise correlation loss 408 by comparing the pyramid of noise maps and the pyramid of shifted noise maps. For example, a pyramid of noise maps includes a collection of noise maps (and/or shifted noise maps) having different resolutions. To illustrate, a pyramid of noise maps includes a set of noise maps arranged in a hierarchical order according to resolution. Resolution can include a measure of detail or specificity of a digital item. Thus, for example, a pyramid can vary in resolution from 256×256 to a different resolution such as 512×512.

In one or more embodiments, for example, starting with an initial noise level $\eta^0 \in \mathbb{R}^{64 \times 64 \times 4}$, the image modification system 106 generates subsequently reduced noise maps by average pooling with a 2×2 neighborhood (multiplied by 2 in order to preserve the expected variance). In one or more embodiments, the image modification system 106 generates 4 subsequent noise maps, including the initial noise map, to form a set $\{\eta^0, \eta^1, \eta^2, \eta^3\}$, where $\eta^3$ comprises an 8×8 feature size.

Accordingly, in one or more embodiments, the image modification system 106 determines the pairwise correlation loss 408 for a pyramid p based on the sum of squares of the auto-correlation coefficients at possible offset values δ, normalized over noise map sizes $S_p$. For example, in some embodiments, the image modification system 106 determines the pairwise correlation loss according to the following:

$$\mathcal{L}_{pair} = \sum_p \frac{1}{S_p^2} \sum_{\delta=1}^{S_p - 1} \sum_{x,y,c} \eta_{x,y,c}^p \left( \eta_{x-\delta,y,c}^p + \eta_{x,y-\delta,c}^p \right)$$

where $$\eta_{x,y,c}^p \in \mathbb{R}$$

indexes into a spatial location using circular indexing.

As further illustrated in FIG. 4, in some embodiments, the image modification system 106 determines the divergence loss 412 by comparing the noise map 404 to a standard distribution 410. A standard distribution, for example, includes a reference distribution. Thus, for example, a standard distribution can include a Gaussian distribution (or a different non-Gaussian distribution) with a particular reference position (e.g., a reference mean or average). In some implementations, the standard distribution is a zero-mean (or other reference mean, such as one or ten mean), unit-variance distribution. In particular, the image modification system 106 adjusts the noise map 404 according to the divergence loss 412 to reduce differences between the noise map 404 and the standard distribution 410. For instance, in some implementations the image modification system 106 guides the noise map towards a zero-mean, unit-variance distribution (e.g., such that the auto-correlation function approaches or equals a Kronecker delta function). In some embodiments, for example, the divergence loss 412 is determined according to the Kullback-Leibler (KL) divergence (or relative entropy) of the noise map 404.

The image modification system 106 can utilize a variety of loss functions to determine various measures of loss described herein. For example, the image modification system 106 can utilize loss functions including mean absolute error (L1) loss functions, mean squared error (L2) loss functions, cross entropy loss functions, or Kullback-Leibler loss (as just mentioned).

As mentioned above, in one or more embodiments, the image modification system 106 determines the auto-correlation regularization loss 414 by combining the pairwise correlation loss 408 and the divergence loss 412. Further, in some embodiments, the image modification system 106 utilizes a weight λ to soften the effects of the divergence loss 412 in order to prevent divergence during denoising of the resulting inverted noise map. In other words, in one or more embodiments, the image modification system 106 determines the auto-correlation regularization loss by weighting the divergence loss. Alternatively, in some embodiments, the image modification system 106 determines the auto-correlation regularization loss by weighting the pairwise correlation loss by a first weight and the divergence loss by a second weight.

Figure 5:
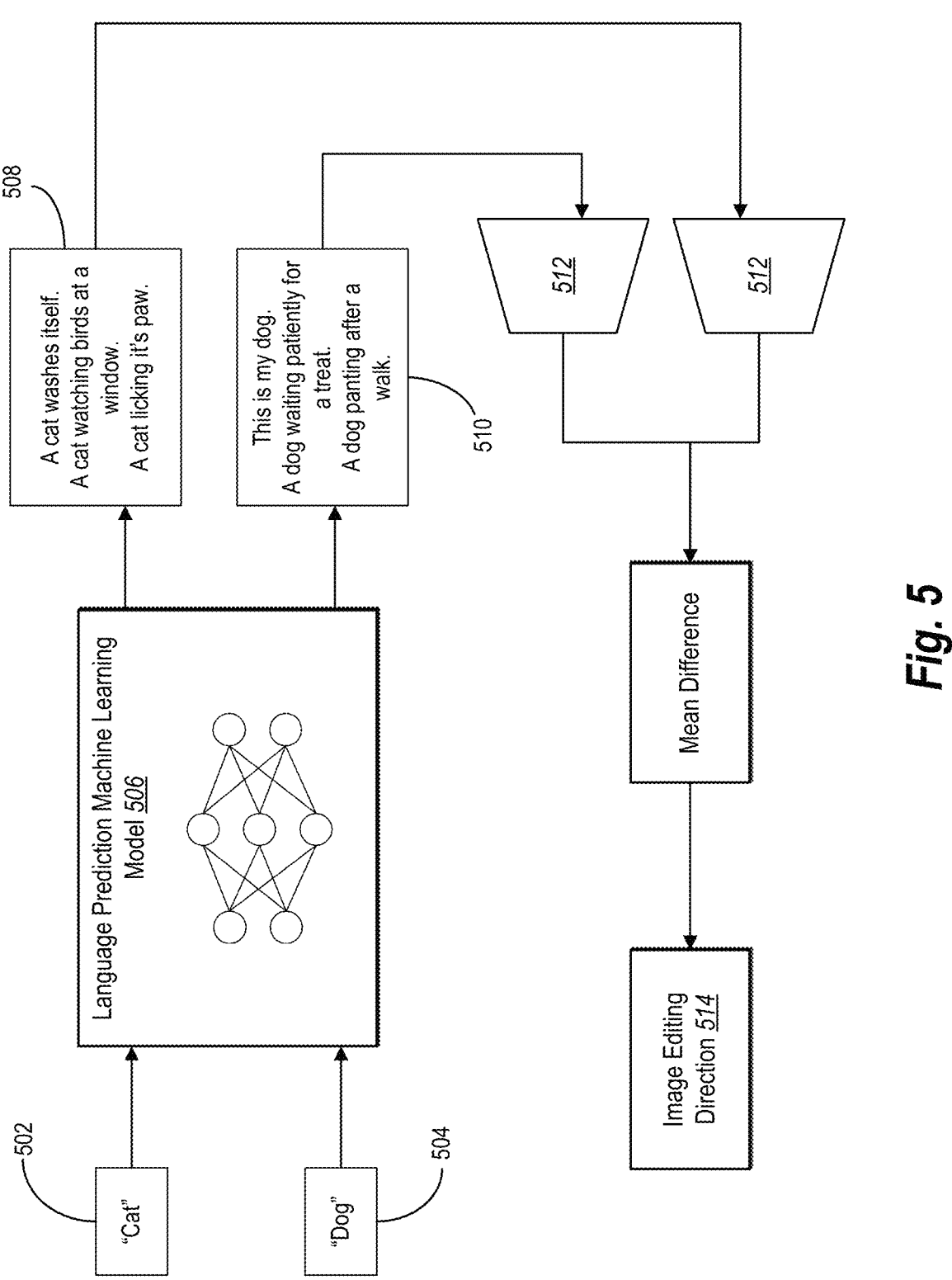
FIG. 5 illustrates an image modification system generating an image editing direction in accordance with one or more embodiments.

As mentioned above, in some embodiments, the image modification system 106 generates image editing directions utilizing an edit direction generation model. For example, FIG. 5 illustrates the image modification system 106 generating an image editing direction 514 between a source visual feature (a "cat") and a target visual feature (a "dog"). More specifically, FIG. 5 shows the image modification system 106 determining the image editing direction 514 between a first textual identifier 502 corresponding to a source visual feature and a second textual identifier 504 corresponding to a target visual feature. For example, a textual identifier can include a textual representation of a digital image. To illustrate, a textual identifier can include a textual description of a visual feature of a digital image. A visual feature, for example, can include a scene, object, or characteristic of a digital image. To illustrate, a visual feature can include a characteristic or one or more persons, animals, plants, other objects within a digital image, and a textual identifier can identify one or more of a type, category, or characteristic(s) of a visual feature. Also, a visual feature can include scenes details or visual characteristics of a digital image, such as an artistic medium, a genre, a setting (e.g., place, season, weather, etc.), a color scheme, or the like. A visual feature can refer to source visual features (e.g., visual features of a source digital image) and/or target visual features (e.g., visual features of a target digital image).

As shown, in some embodiments, the image modification system 106 generates image editing directions between textual identifiers independent of digital images. In other words, while the first textual identifier 502 may correspond to a cat portrayed within a particular digital image, the image editing direction 514 generated by the image modification system 106 can be utilized by a generative neural network (as described herein) to modify virtually any digital image portraying a cat to change the depicted cat to resemble a dog. An image editing direction, for example, can include a representation or encoding of an edit to a digital image (e.g., an embedding that can be implemented or analyzed by a generative neural network to introduce modifications to an input digital image). For instance, an image editing direction can include a directional encoding that indicates a direction within the feature space between a source and target feature (e.g., a direction between a dog and a cat in a feature space). To illustrate, an image editing direction can include a vector or slider within an embedded (latent) space that is operable to implement a particular edit (e.g., an edit to an embedded version of the input digital image within that space in generating a modified version of the image with a generator of the generative neural network).

Moreover, visual features can be identified (and labeled with textual identifiers) by a variety of methods. For example, in some implementations, visual features are randomly selected to generate predetermined image editing directions for a variety of image modifications (e.g., cat to dog, cat to frog, cat to automobile). Alternatively or additionally, in some implementations, visual features and/or textual identifiers are indicated by user input, such as natural language input, user selection of a visual feature, and so forth. A natural language input, for example, can include a string of characters or words describing a digital image and/or a desired edit to a digital image. To illustrate, a natural language input can include one or more sentences identifying and/or describing various features of a digital image, and can include a verbal to request to modify one or more of the identified features. The image modification system 106 can receive a natural language input via audio input (e.g., spoken language input) and/or via a text input.

As illustrated in FIG. 5, the image modification system 106 utilizes a language prediction machine learning model 506 to generate a first plurality of phrases 508 based on the first textual identifier 502 and a second plurality of phrases 510 based on the second textual identifier 504. A language prediction model includes one or more computer-implemented models (i.e., machine learning models) that generates phrases or captions from a digital image. The image modification system 106 can utilize a variety of language prediction models, including recurrent neural network architectures, such as a long-short term memory neural network, or natural language processing models. For example, in some embodiments, the language prediction machine learning model 506 comprises a GPT-3 sentence generator, such as described by Tom Brown, et al. in *Advances in neural information processing systems,* 33:1877-1901, 2020, which is incorporated by reference in its entirety herein.

Accordingly, the image modification system 106 utilizes the language prediction machine learning model 506 to generate a diverse bank of phrases (i.e., sentences) for both the first and second textual identifiers 502, 504. While FIG. 5 provides a few example phrases of the first and second pluralities of phrases 508, 510 generated by the language prediction machine learning model 506 for illustrative purposes, in some embodiments, the image modification system 106 utilizes the language prediction machine learning model 506 to generate a large number of phrases, such as, for example, 10 phrases, 100 phrases, 1000 phrases, or other numbers of phrases therebetween and above. Each phrase, for example, can include a grouping of characters or words that includes the source or target textual identifier. To illustrate, a phrase can include a sentence using the respective textual identifier or a short expression that includes the respective textual identifier. Various non-limiting examples of phrases are provided in relation to FIG. 5.

As further illustrated in FIG. 5, the image modification system 106 generates embeddings of the first plurality of phrases 508 and the second plurality of phrases 510 utilizing a text encoder 512. An embedding, for example, can include a translated (i.e., encoded) version of a phrase into an embedded space (e.g., a latent feature space). Thus, the text encoder 512 can generate embedded phrases within a feature space. As discussed, the image modification system 106 can utilize the text encoder 512 generate a variety of embeddings, such as source embeddings and/or target embeddings. For example, the text encoder 512 can generate source embeddings (e.g., embedded phrases describing a source feature). Similarly, the text encoder 512 can generate target embeddings (e.g., embedded phrases describing a target feature).

The image modification system 106 can utilize a variety of different architectures for the text encoder 512, such as a recurrent neural network or a convolutional feature encoder. For example, in some embodiments, the text encoder 512 comprises a text encoder of a trained Constastive Language-Image Pretraining (CLIP) model, such as described by Alec Radford, et al. in *Learning transferable visual models from natural language supervision*, In *International Conference on Machine Learning*, pp. 8748-63. PMLR, 2021, which is incorporated by reference in its entirety herein. In some embodiments, for example, the text encoder 512 comprises a text encoder of a text-conditional convolutional GAN model, such as described by Scott E. Reed, et al. in *Generative adversarial text to image synthesis*, in ICML, 2016, which is incorporated by reference in its entirety herein.

As shown in FIG. 5, the image modification system 106 generates the image editing direction by comparing the embeddings of the first plurality of phrases 508 and the second plurality of phrases 510 to determine a mean difference (or latent distance) between the embeddings. In some embodiments, the image modification system 106 generates the image editing direction by determining an alternative statistical measure between the first plurality of phrases 508 and the second plurality of phrases 510, such as but not limited to the root sum of squares, linear regression analysis, comparison of auto-correlation coefficients, and so forth. Accordingly, the image modification system 106 can generate an image editing direction between a variety of pairs of textual identifiers and, as described in additional detail below (e.g., in relation to FIGS. 8-9), utilize the generated image editing direction to modify a source digital image with a generative neural network.

As mentioned above, in some embodiments, the image modification system 106 utilizes a reference encoding for a source digital image in combination with an image editing direction to introduce modifications to the source digital image utilizing a generative neural network. For example, a reference encoding can include an encoded (i.e., embedded into a latent space) image representation of a source digital image. To illustrate, a reference encoding can include an encoded segmentation map, an encoded depth map, an encoded textual description, or another encoded image representation corresponding to a source digital image. Thus, a reference encoding can include a caption embedding or encoding reflecting an encoding of a caption description a source digital image. In some embodiments, the image modification system 106 utilizes one or more machine learning models to generate the reference encoding of the source digital image. For example, FIG. 6 illustrates the image modification system 106 generating a reference encoding 610 of a source digital image 602 utilizing a vision-language machine learning model 604 and a text encoder 608.

Figure 6:
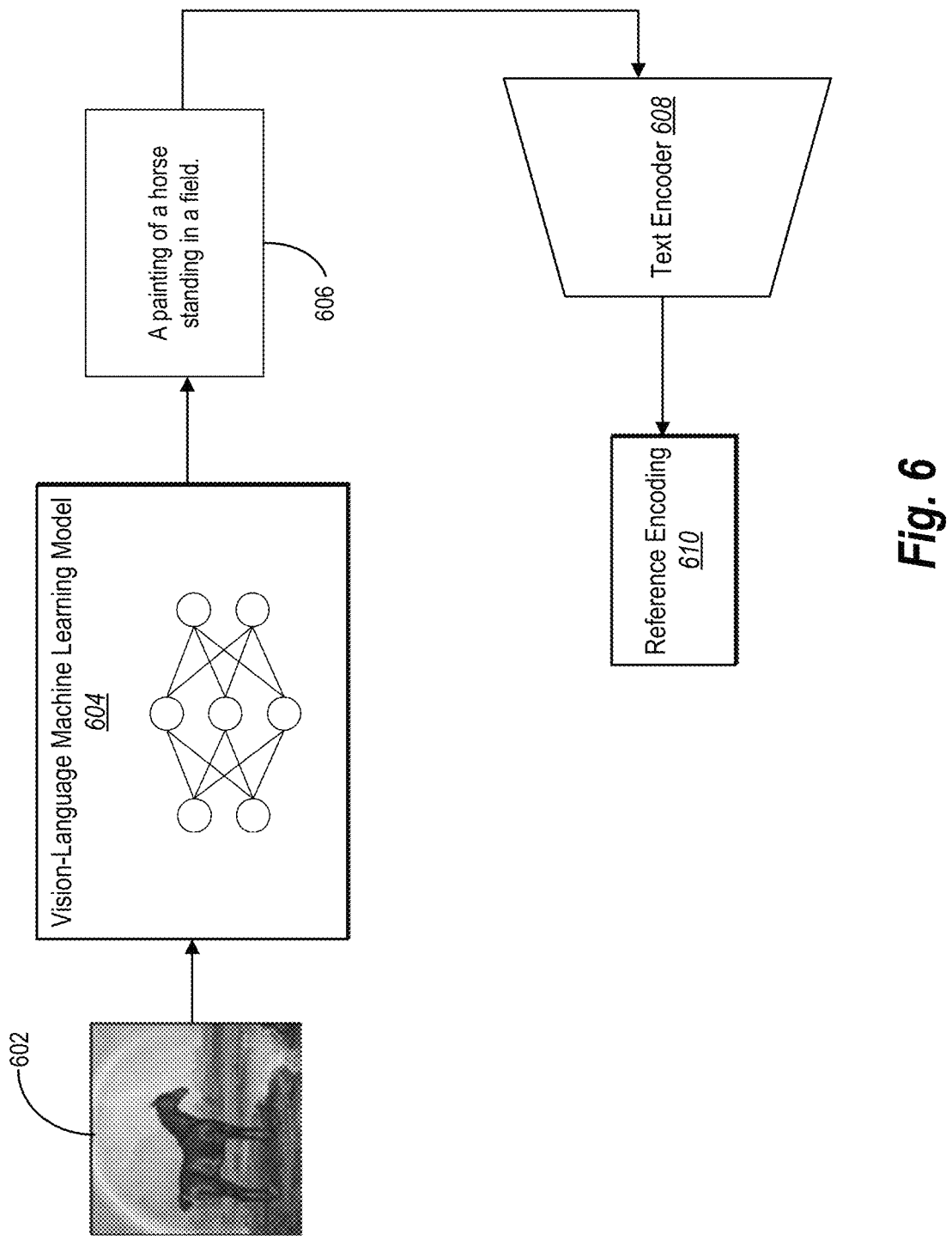
FIG. 6 illustrates an image modification system generating a reference encoding of a digital image in accordance with one or more embodiments.

More specifically, as shown in FIG. 6, the image modification system 106 utilizes the vision-language machine learning model 604 to generate an image caption 606 describing the source digital image 602. An image caption includes a description of a digital image (e.g., a textual description of a digital image). For instance, in the implementation shown, the image caption 606 generated from the source digital image 602 reads as follows: "A painting of a horse standing in a field." In other implementations, the image caption 606 can include more or less detail than the example provided in FIG. 6.

The image modification system 106 can utilize a variety of machine learning model architectures for the vision-language machine learning model 604 to generate image captions from visual features of a digital image. In some embodiments, for example, the vision-language machine learning model 604 comprises a Bootstrapping Language-Image Pre-Training (BLIP) model, such as described by Junnan Li, et al. in *Blip: Bootstrapping language-image*

16

*pre-training for unified vision-language understanding and generation*, in *ICML*, 2022, which is incorporated by reference in its entirety herein. In other embodiments, for example, the vision-language machine learning model 604 comprises alternative frameworks for unifying vision and language tasks, such as but not limited to a Vision-Language Pre-Training (VLP) model, as described by L. Zhou, et al., in *Unified Vision-Language Pre-Training for Image Captioning and VQA* in *Proceedings of the AAAI Conference on Artificial Intelligence*, 34(07), 13041-13049, which is incorporated by reference in its entirety herein.

Moreover, in some embodiments, the image modification system 106 extracts textual identifiers for visual features of the source digital image 602 from the image caption 606. In the illustrated implementation, for example, the image modification system 106 can identify a horse within the source digital image 602 by identifying the word (i.e., textual identifier) "horse" within the image caption 606.

As further illustrated in FIG. 6, the image modification system 106 utilizes a text encoder 608 to generate the reference encoding 610 from the image caption 606. In some implementations, the image caption is provided by a user or alternative method. The text encoder 608, for example, in one or more embodiments, comprises a text encoder of a CLIP model, such as mentioned above in relation to the text encoder 512 of FIG. 5. As mentioned above, in one or more embodiments, the image modification system 106 utilizes the reference encoding 610 to guide a generative neural network when generating a modified digital image from the source digital image 602 (e.g., as described below in relation to FIGS. 7-9).

As mentioned above, in some embodiments, the image modification system 106 utilizes a cross-attention guidance model to guide a diffusion neural network in denoising an inversion of a digital image to generate a modified digital image. For example, FIG. 7 illustrates the image modification system 106 determining a cross-attention loss 720 (also represented as $\mathcal{L}_{xa}$) to guide denoising of an inversion 702 of a source digital image while incorporating modifications to the source digital image.

Figure 7:
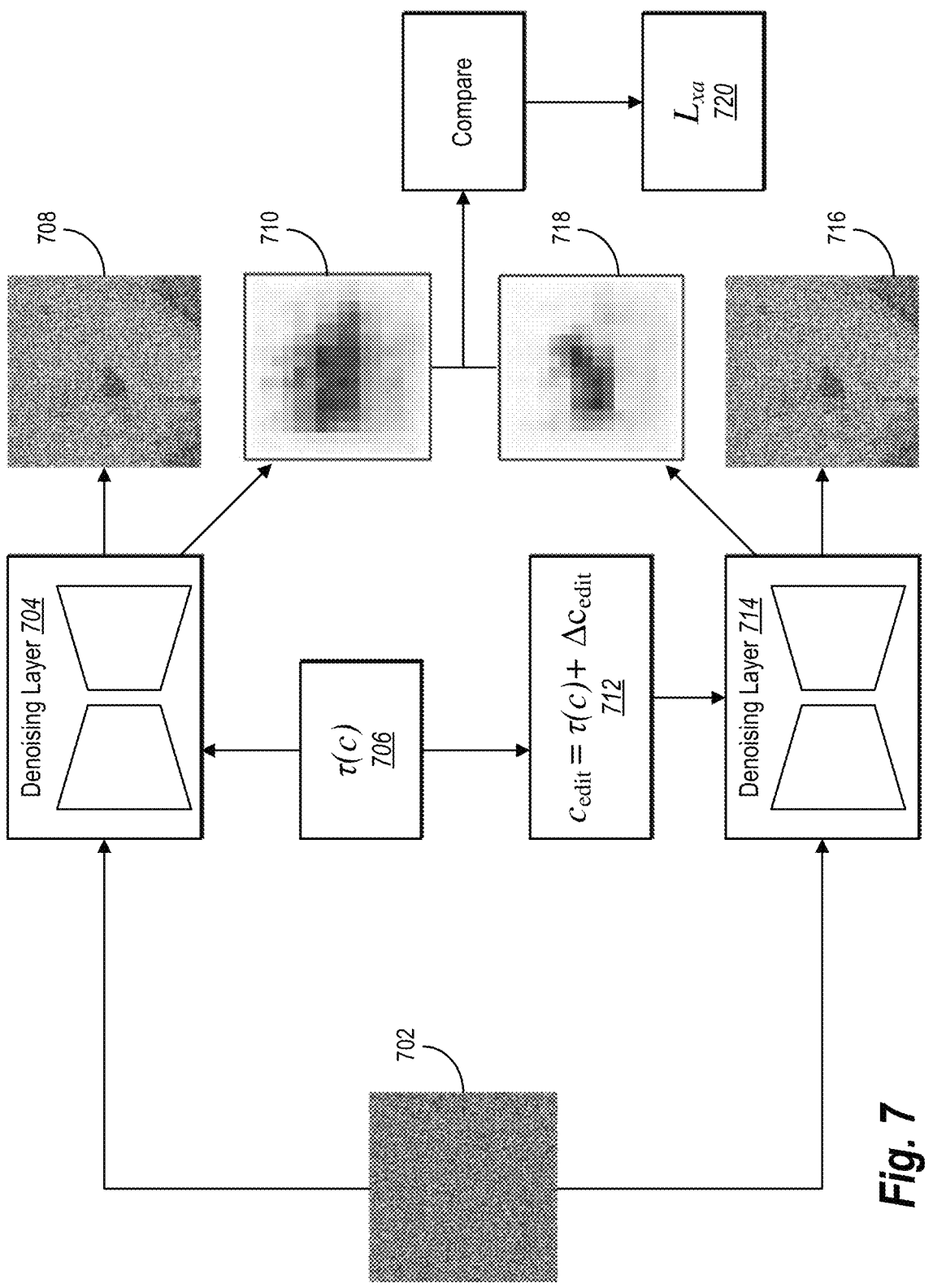
FIG. 7 illustrates an image modification system determining a cross-attention loss in accordance with one or more embodiments.
Figure 8:
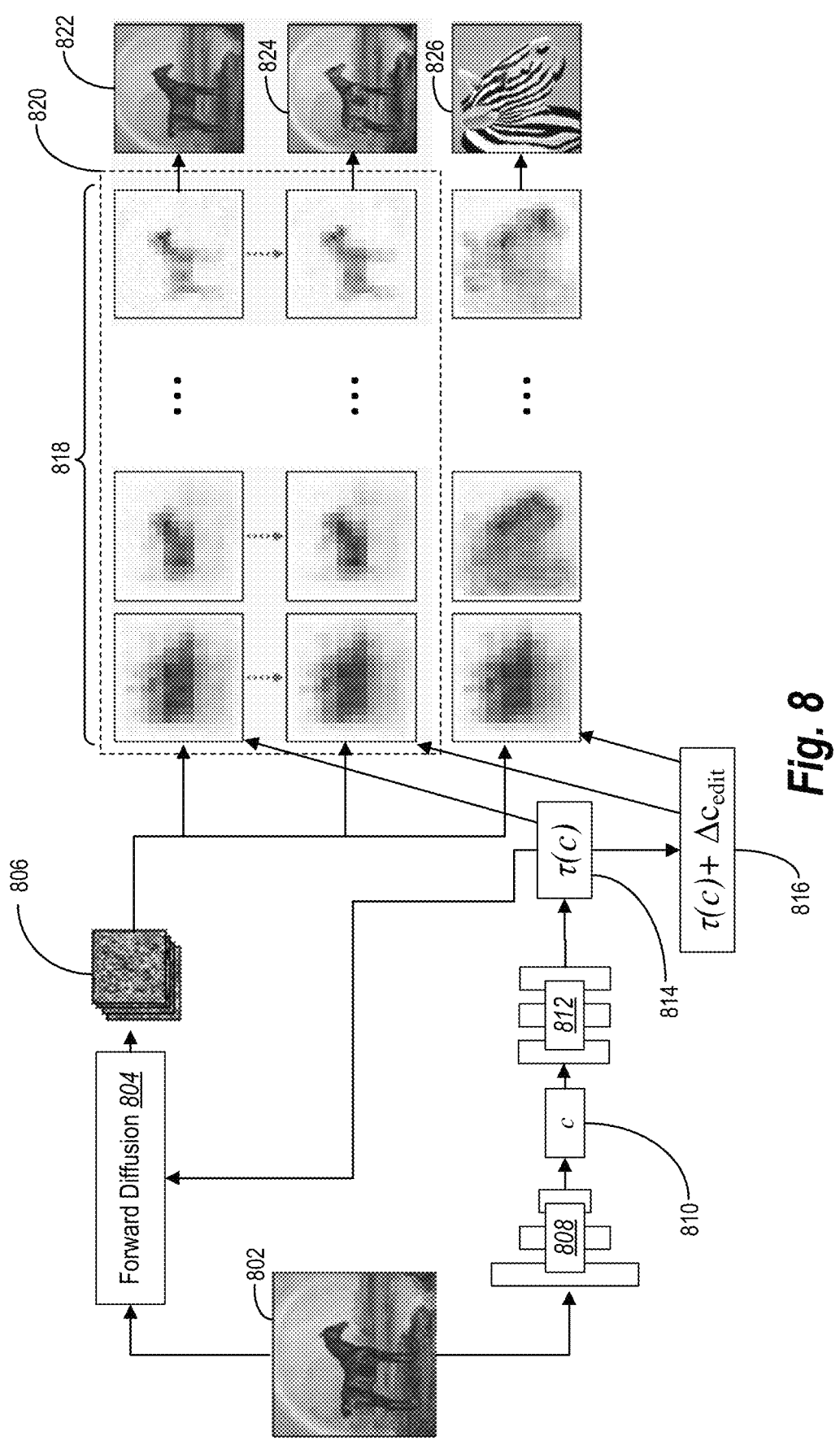
FIG. 8 illustrates an image modification system generating a modified digital image utilizing diffusion-based editing in accordance with one or more embodiments.
Figure 9:
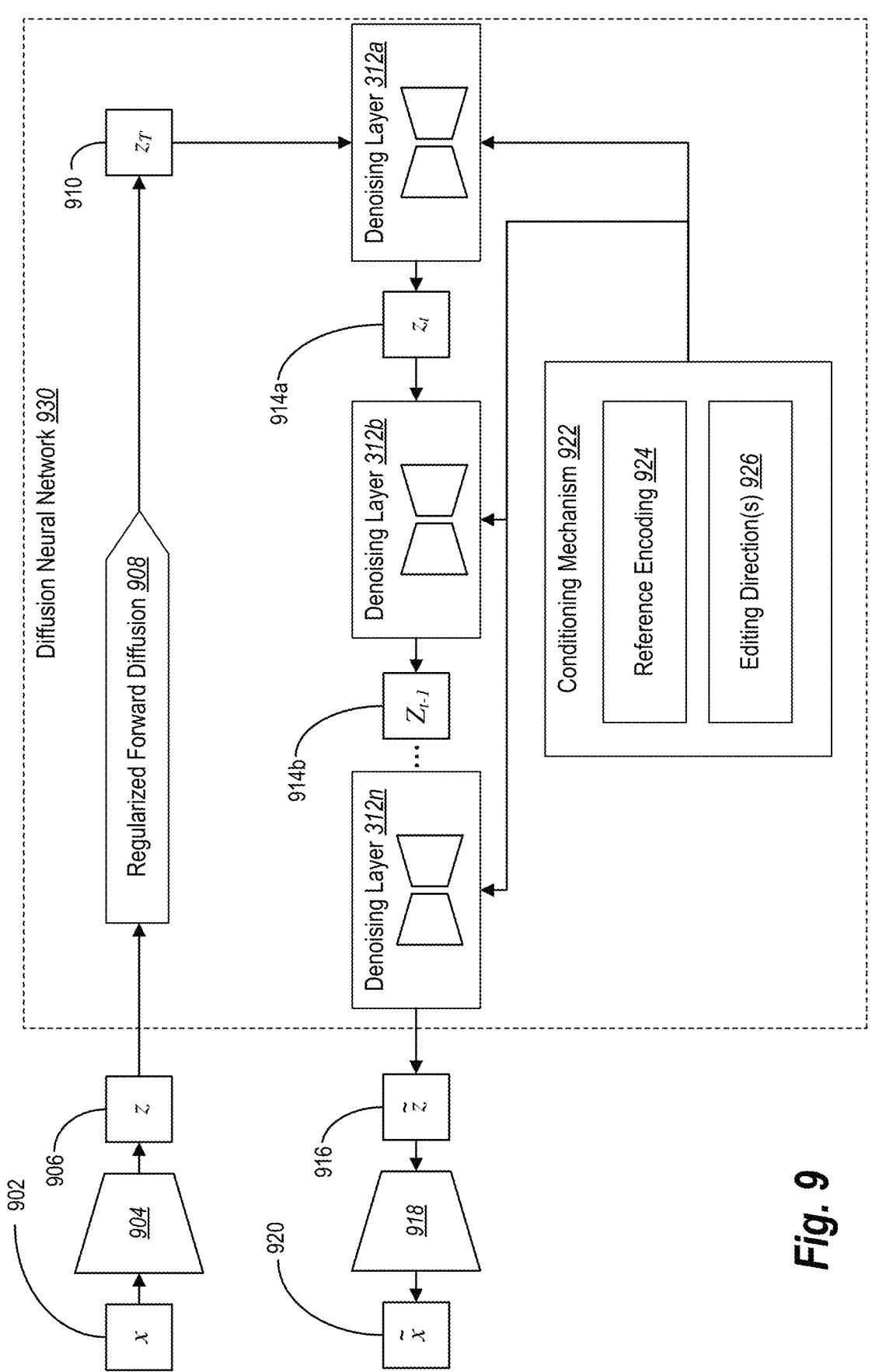
FIG. 9 illustrates an image modification system generating a modified digital image utilizing a diffusion neural network with a conditioning mechanism in accordance with one or more embodiments.

The image modification system 106 can utilize a variety of neural network formulations for the denoising layers of diffusion neural networks described in relation to FIGS. 7-9. For example, in some implementations, the image modification system 106 utilizes a time conditional U-Net, as described by O. Ronneberger, et al. in *U-net: Convolutional networks for biomedical image segmentation*, MICCAI (3), Vol. 9351 of Lecture Notes in Computer Science, p. 234-241 (2015), which is incorporated by reference herein in its entirety. Alternatively, the image modification system 106 can utilize an architecture based at least in part on a Wide ResNet, such as described by S. Zagaruyko et al. in *Wide residual networks* in arXiv: 1605.07146, May 2016, which is incorporated by reference herein in its entirety.

As illustrated, the image modification system 106 utilizes one or more denoising layers of a diffusion neural network to generate intermediate denoising predictions from the inversion 702. A denoising prediction, such as an intermediate image reconstruction prediction or an intermediate edited image prediction, for example, includes a result of a denoising layer of a diffusion neural network removing noise from an inverted noise map (or an intermediate denoised iteration thereof, an intermediate noise map) to iteratively reconstruct a digital image corresponding to the inverted noise map. In some implementations, the inversion 702 includes an inverted noise map generated by regularized forward diffusion as described above (e.g., in relation to FIGS. 3-4). Also, while FIG. 7 illustrates one instance (i.e., iteration) of the image modification system 106 determining the cross-attention loss 720 associated with denoising of the inversion 702, the image modification system 106, in some embodiments, implements the following operations to guide the iterative denoising of the inversion 702 until a modified digital image is generated, such as further described below in relation to FIGS. 8-9.

Accordingly, as illustrated in FIG. 7, the image modification system 106 utilizes a reconstruction denoising layer 704 of the diffusion neural network to generate an intermediate image reconstruction prediction 708 for the inversion 702 (without applying an editing direction). Further, the image modification system 106 conditions the reconstruction denoising layer 704 with a reference encoding 706 (also represented as $\tau(c)$), such as described above in relation to FIG. 6. For example, in some embodiments, image modification system 106 utilizes a text encoder to generate the reference encoding 706 from an image caption describing the source digital image corresponding to the inversion 702.

As further illustrated, the image modification system 106 generates a reference cross-attention map 710 between the intermediate image reconstruction prediction 708 and the reference encoding 706. In some implementations, the reference cross-attention map 710 is associated with and/or represents the structural details of the source digital image corresponding to the inversion 702. Accordingly, in some embodiments, the image modification system 106 utilizes cross-attention maps to guide denoising of an inversion during reconstruction and/or modification thereof in order to preserve the structural details of the source digital image.

Similarly, the image modification system 106 utilizes an image editing denoising layer 714 of the diffusion neural network to generate an intermediate edited image prediction 716 for the inversion 702, also implementing an image editing direction. The image modification system 106 conditions the image editing denoising layer 714 with an image editing encoding 712 (also represented as $c_{edit}$) to implement an image editing direction $\Delta c_{edit}$ to the inverted digital image (the inversion 702). An image editing encoding includes an embedding or encoding that reflects a digital image and an edit to the digital image. As shown, the image editing encoding 712 comprises a combination of the reference encoding 706 ($\tau(c)$) and the image editing direction $\Delta c_{edit}$. In some embodiments, the image editing direction $\Delta c_{edit}$ includes an image editing direction generated as discussed above (e.g., in relation to FIG. 5).

As further illustrated, the image modification system 106 generates an editing cross-attention map 718 between the intermediate edited image prediction 716 and the image editing encoding 712. Moreover, the image modification system 106 preserves structural details during denoising of the inversion 702 by encouraging the editing cross-attention map 718 to coincide with the reference cross-attention map 710 when modifying the inversion 702 according to the image editing encoding 712. More specifically, the image modification system 106 determines the cross-attention loss 720 by comparing the reference cross-attention map 710 and the editing cross-attention map 718, then modifies the intermediate edited image prediction 716 based on the cross-attention loss 720 to generate a modified digital image (e.g., by repeating the foregoing operations until the inversion 702 is completely denoised).

In some embodiments, for example, the image modification system 106 determines the cross-attention loss 720 according to the following:

$$\mathcal{L}_{xa} = \left\| M_t^{edit} - M_t^{ref} \right\|_2$$

where $\mathcal{L}_{xa}$ represents the cross-attention loss 720, $$M_t^{edit}$$

represents the editing cross-attention map 718 (for timestep t), and $$M_t^{ref}$$

represents the reference cross-attention map 710 (for timestep t). In one or more embodiments, the image modification system 106 generates different cross-attention maps $$M_t^{ref} \text{ and } M_t^{edit}$$

for each timestep t or, in other words, for each iteration or at each consecutive denoising layer of the diffusion neural network. Accordingly, in some embodiments, the image modification system 106 updates each iteration of the intermediate edited image prediction 716 to reduce a difference between the reference cross-attention map $$710 \left( M_t^{ref} \right)$$

and the editing cross attention map 718

$$718 \left( M_t^{edit} \right).$$

Furthermore, in one or more embodiments, the image modification system 106 generates each cross-attention map M, such as the reference cross-attention map 710 and the editing cross-attention map 718 according to the following:

$$\text{Attention}(Q,K,V) = M \cdot V$$

where cross-attention map $M = \text{Softmax}(QK^T/\sqrt{d})$. Furthermore, query $Q = W_Q \varphi(x_t)$, key $K = W_K \tau(c)$, and value $V = W_V \tau(c)$ are computed with learnt projections $W_Q$, $W_K$, and $W_V$ applied on intermediate special features $\varphi(x_t)$ of the denoising layers of the diffusion neural network and the reference encoding $\tau(c)$, and d represents the dimension of projected keys and queries. Thus, in one or more embodiments, the image modification system 106 utilizes a key query value approach. In particular, for each query (e.g., text representation from the reference encoding) the image modification system 106 identifies a matching key (e.g., intermediate unit feature). In particular, the image modification system 106 determines learned similarity values between text from a particular coordinate and a particular key (e.g., with probabilities indicating similarity). The system then utilizes a softmax to populate the map at each coordinate. See, e.g., Ashish Vaswani, et al., *Attention is all you need in NeurIPS*, 2017, which is incorporated by reference in its entirety herein.

As mentioned above, in some embodiments, the image modification system 106 utilizes a diffusion neural network with cross-attention guidance to generate a modified digital image with preserved details from a source digital image. For example, FIG. 8 illustrates the image modification system 106 utilizing a cross-attention guidance model 820 at multiple denoising layers of a diffusion neural network to generate a modified digital image 824. To further illustrate, FIG. 8 shows the image modification system 106 generating cross-attention maps 818 at multiple denoising iterations while generating a reconstructed digital image 822, the modified digital image 824, and an unguided modified digital image 826.

As illustrated, the image modification system 106 generates an inversion 806 (i.e., an inverted noise map) of a source digital image 802 utilizing forward diffusion 804. In some implementations, the forward diffusion 804 includes regularized forward diffusion as described above in relation to FIGS. 3-4. As also shown, in some implementations, the forward diffusion 804 is conditioned with a reference encoding 814 (also represented as τ(c)). Furthermore, as illustrated, the image modification system 106 conditions reconstruction of the inversion 806 with the reference encoding 814 to generate the reconstructed digital image 822.

As also shown, in some implementations, the image modification system 106 generates the reference encoding 814 utilizing a text encoder 812 to encode an image caption 810 (also represented as c) describing the source digital image 802. Furthermore, in some implementations, the image modification system 106 utilizes a vision-language machine learning model 808 to generate the image caption 810 from the source digital image 802 (e.g., as described above in relation to FIG. 6). Also, the image modification system 106 utilizes the reference encoding 814 to condition various operations for generating the reconstructed digital image 822, the modified digital image 824, and the unguided modified digital image 826.

Moreover, the image modification system 106 combines the reference encoding 814 (τ(c)) with an image editing direction ($\Delta c_{edit}$) to generate an image editing encoding 816. In some implementations, for example, the image modification system 106 generates the image editing direction ($\Delta c_{edit}$) between two visual features utilizing a language prediction machine learning model and a text encoder, such as described above in relation to FIG. 5.

Accordingly, as illustrated in FIG. 8, the image modification system 106 utilizes the cross-attention guidance model 820 to preserve details of the source digital image 802 in the modified digital image 824. For instance, for multiple iterations of reverse diffusion of the inversion 806 (i.e., iterative denoising of the inversion 806) conditioned on the reference encoding 814, the image modification system 106 generates reconstruction cross-attention maps 818 (see top row of cross-attention maps 818) between the reference encoding 814 and reconstruction predictions generated by denoising layers of a diffusion neural network (e.g., as described above in relation to FIG. 7). Also, for multiple iterations of reverse diffusion of the inversion 806 (i.e., iterative denoising of the inversion 806) conditioned on the image editing encoding 816, the image modification system 106 generates editing cross-attention maps 818 (see middle row of cross-attention maps 818) between the image editing encoding 816 and edited image predictions generated by denoising layers of the diffusion neural network (e.g., as also described above in relation to FIG. 7).

Furthermore, the image modification system 106 utilizes the cross-attention guidance model 820 to encourage correlation between reconstruction cross-attention maps 818 (top row) and editing cross-attention maps 818 (middle row). In some implementations, the image modification system 106 utilizes a first channel of the diffusion neural network to generate the reconstruction cross-attention maps 818 and a second channel of the diffusion neural network to generate the editing cross-attention maps 818. For instance, the image modification system 106 modifies intermediate edited image noise maps based on comparing the cross-attention maps 818 corresponding to reconstruction (i.e., generation of the reconstructed digital image 822) and modification (i.e., generation of the modified digital image 824). In particular, the image modification system 106 utilizes a cross-attention loss to reduce difference between cross-attention maps 818 (top and middle rows), thus preserving structural details of the source digital image 802 as represented by the reconstruction cross-attention maps 818 (top row). Indeed, as shown in FIG. 8, the modified digital image 824 accurately implements the image editing direction (i.e., changes the horse to a zebra) while preserving the overall structure of the source digital image 802.

To further illustrate, FIG. 8 shows multiple sequential cross-attention maps 818 associated with generating the unguided modified digital image 826. In particular, the unguided modified digital image 826 is generated without implementing the cross-attention guidance model 820 to preserve structural details of the source digital image 802. Indeed, the structure of the source digital image 802, as illustrated by the final row of cross-attention maps 818, is not maintained during denoising of the inversion 806 conditioned with the image editing encoding 816, resulting in the unguided modified digital image 826 lacking in fidelity to the source digital image 802. Further experimental results are discussed below in relation to FIGS. 10-13.

To further illustrate, in one or more embodiments, the image modification system 106 utilizes cross-attention guidance to generate a modified digital image (or a modified latent code corresponding thereto) according to the following algorithm:

Input: $x_T$ (same as $x_{inv}$): noise-regularized inversion of latent code corresponding to source digital image, c: image caption, τ: text encoder, $\Delta c_{edit}$: image editing direction, $\lambda_{xa}$: cross-attention guidance weight Output: $x_0$ (final edited latent code corresponding to modified digital image)

Compute reference cross-attention maps $$\text{for } t = T \ldots 1 \text{ do}$$
$$\hat{\epsilon}, M_t^{ref} \leftarrow \epsilon_\theta(x_t, t, \tau(c))$$
$$x_{t-1} = \text{UPDATE}(x_t, \hat{\epsilon}, t)$$
$$\text{end for}$$

Edit with cross-attention guidance $$c_{edit} = \tau(c) + \Delta c_{edit}$$
$$\text{for } t = T \ldots 1 \text{ do}$$
$$\_, M_t^{edit} \leftarrow \epsilon_\theta(x_t, t, c_{edit})$$
$$\Delta x_t = \nabla_{x_t} \left( \left\| M_t^{edit} - M_t^{ref} \right\|_2 \right)$$

-continued $$\hat{\epsilon}_{,-} \leftarrow \epsilon_\theta(x_t - \lambda_{xa}\Delta x_t, t, c_{edit})$$

$$x_{t-1} = \text{UPDATE}(x_t, \hat{\epsilon}, t)$$

end for

Update current state $x_t$ with noise prediction $\hat{\epsilon}$ function UPDATE($x_t$, $\hat{\epsilon}$, $t$)

$$f_\theta = \frac{x_t - \sqrt{1 - \alpha_t}\,\hat{\epsilon}}{\sqrt{\alpha_t}}$$

$$x_{t-1} = \sqrt{\alpha_{t-1}}\,f_\theta + \sqrt{1 - \alpha_{t-1}}\,\hat{\epsilon}$$

return $x_{t-1}$ end function

As mentioned above, in some embodiments, the image modification system 106 utilizes a regularized inversion model and a cross-attention guidance model with a diffusion neural network to generate a modified digital image. For example, FIG. 9 illustrates the image modification system 106 generating a modified digital image 920 utilizing a diffusion neural network 930. In particular, FIG. 9 shows the image modification system 106 generating an inversion 910 of (e.g., a diffused latent vector representing) a source digital image 902 utilizing regularized forward diffusion 908 and generating the modified digital image 920 utilizing a conditioning mechanism 922 with denoising layers 312a-312n of the diffusion neural network 930.

As illustrated, the image modification system 106 utilizes a neural network encoder 904 to generate a latent vector 906 from the source digital image 902 by projecting the source digital image 902 into a latent space. In some embodiments, for example, a neural network encoder can include a Style-GAN encoder that projects detailed and edited segments into a residual detail latent code in the Style space. In another example, a neural network encoder comprises a ReStyle encoder that projects detailed and edited segments into a residual detail latent code in the W+ space. Moreover, in some embodiments, the image modification system 106 utilizes a ReStyle Encoder (or a modified version thereof) as described by Y. Alaluf, et al. in *Restyle: A residual-based stylegan encoder via iterative refinement*. arXiv preprint arXiv:2104.02699, 2021, the content of which is hereby incorporated by reference in its entirety.

As further illustrated, the image modification system 106 utilizes regularized forward diffusion 908, such as described above in relation to FIGS. 3-4, to generate a diffused latent vector 910 (i.e., an inversion or inverted noise map) of the latent vector 906. In some embodiments, regularized forward diffusion 908 includes gradually adding noise (e.g., Gaussian noise) to the signal of the latent vector (e.g., until the signal is destroyed or replaced) utilizing a fixed Markov Chain or related process, resulting in the diffused latent vector 910. The image modification system 106 then utilizes trained denoising layers 312a-312n of the diffusion neural network 930 (of length T equal to the length of the Markov Chain or related process) to reverse the regularized forward diffusion 908.

As illustrated, the image modification system 106 can also conditionalize (i.e., condition) one or more of the denoising layers 312a-312n based on various inputs. For example, as shown in FIG. 9, the image modification system 106 utilizes a conditioning mechanism 922 to condition the denoising layers 321a-312n based on one or more conditioning inputs, such as a reference encoding 924 and/or an image editing direction encoding 926 (e.g., as described above in relation to FIGS. 5-8). In one or more embodiments, for example, the image modification system 106 utilizes a conditioning mechanism as described by Ashish Vaswani, et al., *Attention is all you need in NeurIPS*, 2017, which is also referenced and discussed above in relation to FIG. 7.

Furthermore, as illustrated in FIG. 9, the image modification system 106 utilizes the denoising layer 312a to generate a first denoised latent vector 914a (i.e., an intermediate image prediction) from the diffused latent vector 910 with conditioning from the conditioning mechanism 922. Similarly, the image modification system 106 utilizes the denoising layer 312b to generate a second denoised latent vector 914b (i.e., an intermediate image prediction) from the first denoised latent vector 914a with conditioning from the conditioning mechanism 922. Accordingly, the image modification system 106 utilizes multiple consecutive (i.e., sequential) denoising layers of the diffusion neural network 930 (e.g., a number of denoising layers equal to the number of diffusion steps in the regularized forward diffusion 908 of the latent vector 906) until final denoising layer 312n generates a denoised latent vector 916.

As also shown in FIG. 9, the image modification system 106 utilizes a decoder or generator 918 of a neural network to generate the modified digital image 920. In some embodiments, for example, the generator 918 includes a generative adversarial network (GAN), such as but not limited to the Co-Mod-GAN model described by Shengyu Zhao, et al. in *Large scale image completion via co-modulated generative adversarial networks*, in *ICLR*, 2021, which is incorporated by reference in its entirety herein. As another example, the generator 918 can include a generator of a StyleGAN model, such as described by T. Karras, et al. in *A Style-Based Generator Architecture for Generative Adversarial Networks* in 2019 IEEE/CVF CVPR, which is incorporated by reference in its entirety herein.

The image modification system 106 can utilize modified digital images for a variety of purposes. For example, in some implementations, the image modification system 106 provides modified digital images for display via a client device. In one or more implementations, the image modification system 106 utilizes modified digital images to further train other machine learning models. For example, the image modification system 106 can utilize an input digital image and a modified digital image as a paired dataset for training machine learning models.

Specifically, in some embodiments, the image modification system 106 generates a paired dataset of source and modified digital images for training an image-conditional generative neural network. For instance, in one or more embodiments, the image modification system 106 generates a plurality of modified digital images according to the methods described herein and utilizes the generated images to train a generative neural network to implement one or more predetermined image editing directions. Thus, for example, the image modification system 106 can utilize source cat images and modified dog images to train a first generative neural network to transform cat images into dog images. Similarly, the image modification system 106 can utilize source horse images and modified zebra images to train a second generative neural network to transform horse images into zebra images. The image modification system 106 can then implement these trained generative models at inference time to quickly and accurately generate additional modified digital images. Thus, for example, upon receiving a request to modify a cat image to a dog image, the image modification system 106 can apply the first generative neural network trained based on the paired dataset generated utilizing the approach described above. By training generative neural networks with images generated according to the methods described above (e.g., in relation to FIGS. 8-9), the image modification system 106 can improve the accuracy and efficiency of modifying digital images within a latent space.

Figure 10:
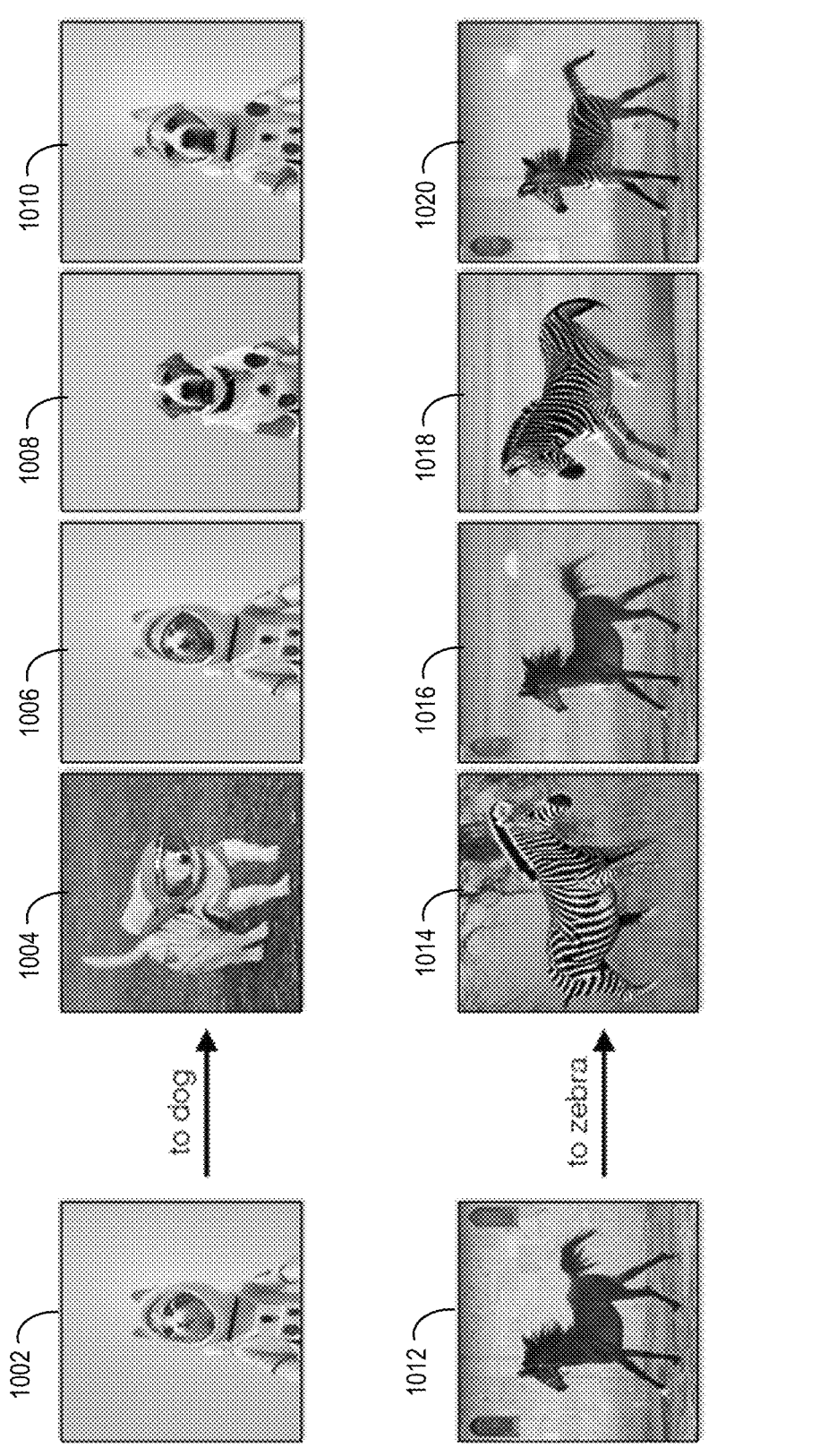

As discussed above, the image modification system 106 provides a variety of technical advantages in generating modified digital images. For example, FIGS. 10-13 show experimental results of example embodiments of the image modification system 106 to generate modified digital images. For instance, FIG. 10 shows multiple results of modifying a visual feature of source digital image to generate a modified digital image. Specifically, FIG. 10 shows multiple results of changing a cat depicted in a first source digital image 1002 to a dog in a first set of modified digital images 1004-1010, and multiple results of changing a horse in a second source digital image 1012 to a zebra in a second set of modified digital image 1014-1020.

The modified digital images 1004 and 1014 are examples of modified digital images generated using an edited word prompt with a conventional method known as SDEdit and described by Chenlin Meng, et al. in *SDEdit: Image synthesis and editing with stochastic differential equations*. arXiv preprint arXiv:2018.01073, 2021. The modified digital images 1006 and 1016 are examples of modified digital images generated using a conventional method known as prompt-to-prompt and described by Amir Hertz, et al. in *Prompt-to-prompt image editing with cross attention control*. arXiv preprint arXiv:2208:01626, 2022. The modified digital images 1008 and 1018 are examples of modified digital images generated using an edited word prompt with a conventional Denoising Diffusion Implicit Model (DDIM), as described by Jiaming Song, et al. in *Denoising diffusion implicit models*. in ICLR, 2021. The modified digital images 1010 and 1020 are examples of modified digital images generated using the image modification system 106 according to one or more embodiments disclosed herein.

Indeed, as shown in FIG. 10, the modified digital images 1010 and 1020 (generated using methods disclosed herein) exhibit a higher fidelity to the respective source digital images 1002 and 1012 in comparison to the modified digital images 1004-1008 and 1014-1018 (generated using conventional methods). In particular, implementations of the image modification system 106 accurately preserve the structural details and overall aesthetic of the original (source) images while effectively implementing the change from a source visual feature (i.e., the cat of source digital image 1002 and the horse of source digital image 1012) to a target visual feature (i.e., the dog of modified digital image 1010 and the zebra of modified digital image 1020).

To further illustrate, FIG. 11 includes a table of experimental results of the various image editing models described above in relation to FIG. 10. As shown, the table includes a comparison of the overall accuracy of model outputs by calculating a CLIP classification accuracy (CLIP-Acc), a background reconstruction error (BG Err), and a segmentation overlap ($S_{iou}$) for each comparative result. Indeed, as shown in FIG. 11, results of the image modification system 106 (labeled "Ours") exhibit substantially increased measures of CLIP classification accuracy while relatively increasing segmentation overlap accuracy and decreasing background reconstruction error.

Additionally, FIG. 12 includes a table of experimental results of implementing various modifications to digital images utilizing the image modification system 106, comparing results of utilizing embodiments with and without cross-attention guidance (e.g., as disclosed above in relation to FIGS. 7-9). As shown, the table includes a comparison of the CLIP classification accuracy (CLIP-acc) and the segmentation overlap ($S_{iou}$) of implementing various image editing directions with and without cross-attention guidance. Indeed, as shown in FIG. 12, cross-attention guidance significantly improves the CLIP classification accuracy and segmentation overlap of modified digital images relative to images generated without cross-attention guidance.

Figure 13:
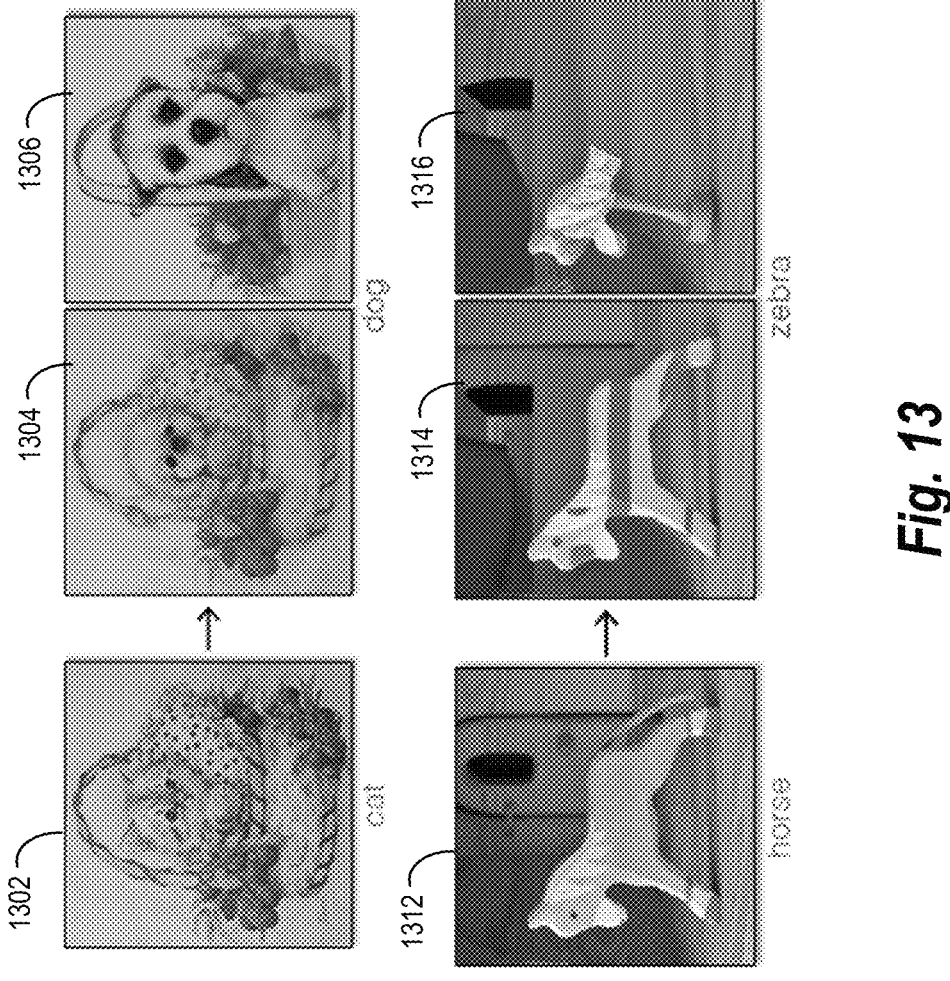

Furthermore, FIG. 13 shows experimental results of generating modified digital images with and without cross-attention guidance according to one or more embodiments. Specifically, FIG. 13 shows multiple results of changing a source visual feature in a source digital image to a target digital feature in a modified digital image, with and without implementing cross-attention guidance as discussed above (e.g., in relation to FIGS. 7-9). For instance, source digital image 1302 portrays a cat, which is modified in digital images 1304 (with cross-attention guidance) and 1306 (without cross-attention guidance) to portray a dog in place of the cat in the source digital image 1302. Similarly, source digital image 1312 portrays a horse, which is modified in digital images 1314 (with cross-attention guidance) and 1316 (without cross-attention guidance) to portray a zebra in place of the horse in the source digital image 1312.

Indeed, as shown in FIG. 13, the modified digital images 1304 and 1314 (generated with cross-attention guidance) exhibit a higher fidelity to the respective source digital images 1302 and 1312 in comparison to the modified digital images 1306, 1316, and 1326 (generated without cross-attention guidance). In particular, implementations of the image modification system 106 accurately preserve the structural details and overall aesthetic of the original (source) images while effectively implementing the change from a source visual feature to a target visual feature.

Figure 14:
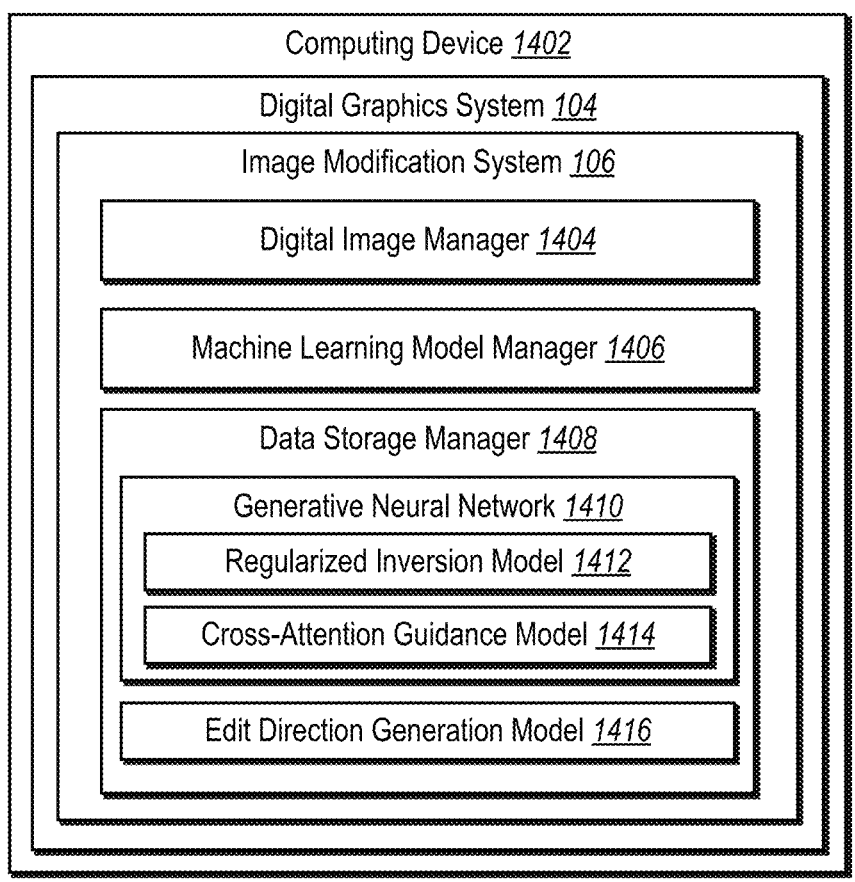
FIG. 14 illustrates a schematic diagram of an image modification system in accordance with one or more embodiments.

Turning now to FIG. 14, additional detail will be provided regarding components and capabilities of one or more embodiments of the image modification system 106. In particular, FIG. 14 illustrates an example image modification system 106 executed by a computing device 1402 (e.g., the server devices(s) 102 or the client device 112). As shown by the embodiment of FIG. 14, the computing device 1402 includes or hosts a digital graphics system 104 and/or the image modification system 106. Furthermore, as shown in FIG. 14, the image modification system 106 includes a digital image manager 1404, a machine learning model manager 1406, and a data storage manager 1408.

As just mentioned, and as illustrated in the embodiment of FIG. 14, the image modification system 106 includes the digital image manager 1404. For instance, the digital image manager 1404 identifies, stores, transmits, and/or displays digital images (and/or modified digital images) as described above (e.g., in relation to FIGS. 1-4, 6, and 8-9). In some instances, the digital image manager 1404 also stores digital images with corresponding reference encodings and/or image editing directions pre-generated by a vision-language machine learning model and/or an edit direction generation model as described above (e.g., in relation to FIGS. 2 and 5-6), and/or modified digital images generated by a generative neural network as described above (e.g., in relation to FIGS. 1-2 and 8-9).

Furthermore, as shown in FIG. 14, the image modification system 106 includes the machine learning model manager 1406. For instance, the machine learning model manager 1406 manages the various machine learning models described herein, such as the language-prediction machine learning model and the text encoder described above (e.g., in relation to FIG. 5), the vision-language machine learning model and the text encoder described above (e.g., in relation to FIG. 6), the other various machine learning models and neural networks described above (e.g., in relation to FIGS. 1-2 and 7-9).

As also shown in FIG. 14, the image modification system 106 includes the data storage manager 1408. In some embodiments, the data storage manager 1408 is implemented by one or more memory devices. Additionally, in certain instances, the data storage manager 1408 maintains data to perform one or more functions of the image modification system 106. For example, the data storage manager 1408 includes digital images, reference encodings, predetermined image editing directions, and machine learning model and/or neural network components (e.g., parameters, channel weights) of a generative neural network 1410, a regularized inversion model 1412, a cross-attention guidance model 1414, and an edit direction generation model 1416.

Each of the components 1404-1416 of the image modification system 106 can include software, hardware, or both. For example, the components 1404-1416 can include one or more instructions stored on a computer-readable storage medium and executable by processors of one or more computing devices, such as a client device or server device. When executed by the one or more processors, the computer-executable instructions of the image modification system 106 can cause the computing device 1402 to perform the methods described herein. Alternatively, the components 1404-1416 can include hardware, such as a special-purpose processing device to perform a certain function or group of functions. Alternatively, the components 1404-1416 of the image modification system 106 can include a combination of computer-executable instructions and hardware.

Furthermore, the components 1404-1416 of the image modification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1404-1416 may be implemented as a stand-alone application, such as a desktop or mobile application. Furthermore, the components 1404-1416 may be implemented as one or more web-based applications hosted on a remote server. The components 1404-1416 may also be implemented in a suite of mobile device applications or "apps." To illustrate, the components 1404-1416 may be implemented in an application, including but not limited to, ADOBE PHOTOSHOP, ADOBE PREMIERE, ADOBE LIGHTROOM, ADOBE ILLUSTRATOR, ADOBE SENSEI, ADOBE CREATIVE CLOUD, or ADOBE STOCK. The foregoing are either registered trademarks or trademarks of Adobe Systems Incorporated in the United States and/or other countries.

Figure 15:
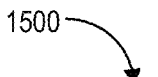
FIG. 15 illustrates a flowchart of a series of acts for generating a modified noise map in accordance with one or more embodiments.
Figure 15:
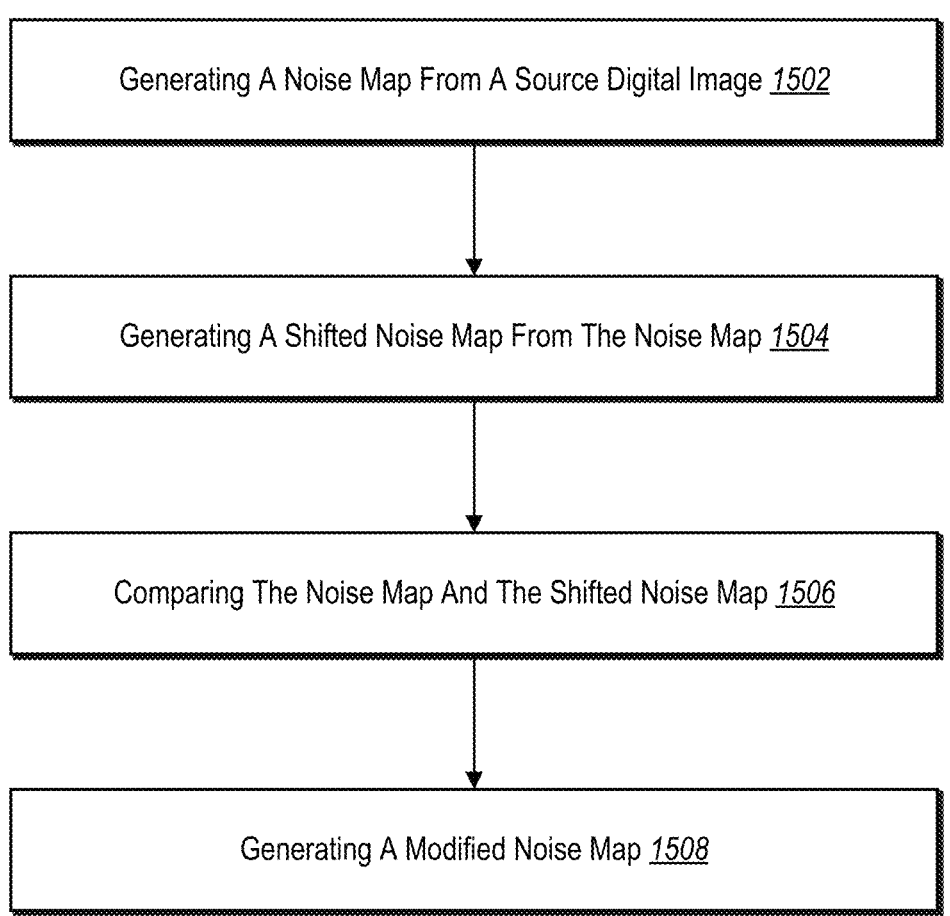
Figure 16:
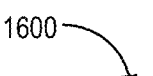
FIG. 16 illustrates a flowchart of a series of acts for generating an image editing direction in accordance with one or more embodiments.
Figure 16:
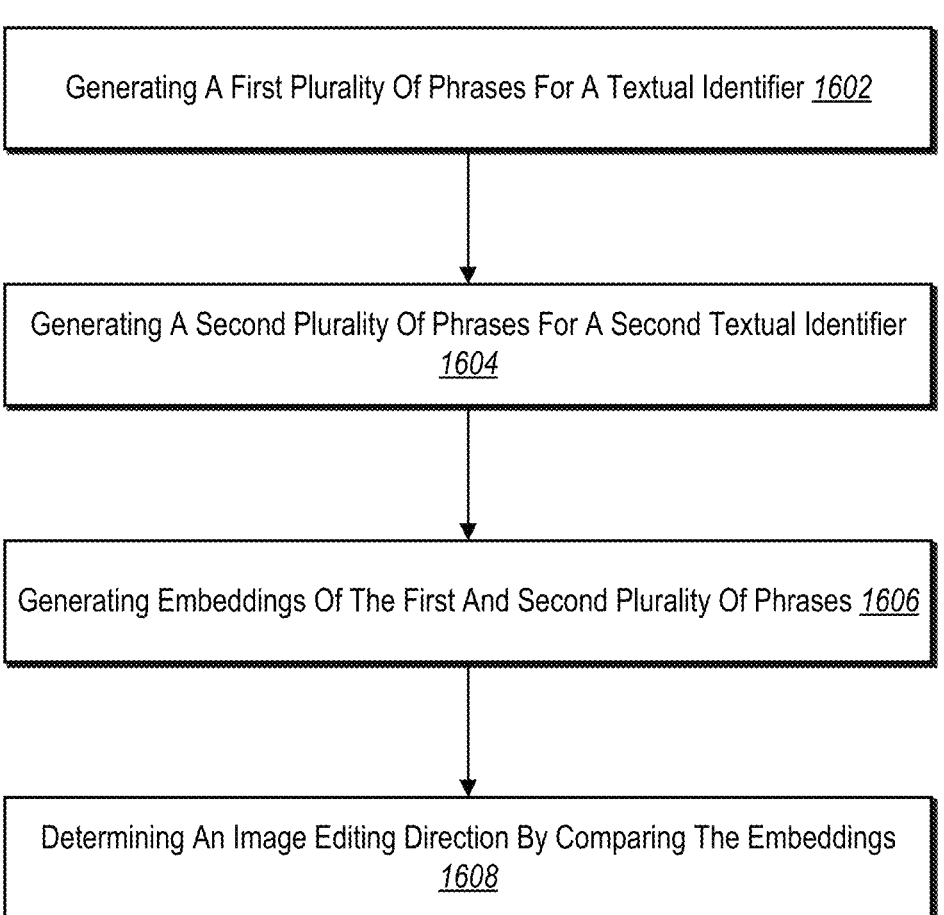
Figure 17:
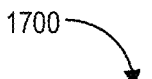
FIG. 17 illustrates a flowchart of a series of acts for generating a modified digital image with cross-attention guidance in accordance with one or more embodiments.
Figure 17:
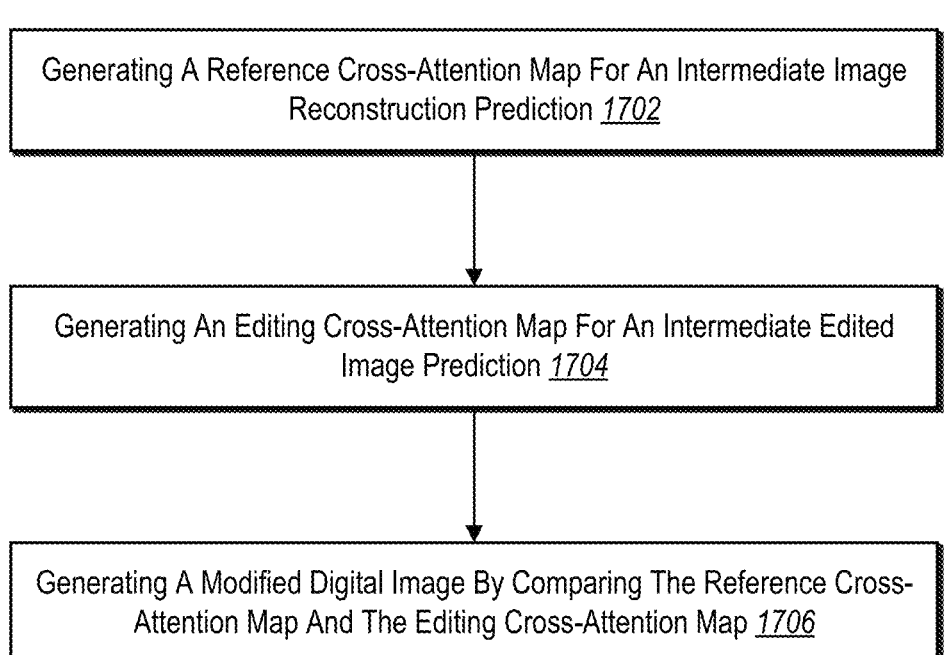

FIGS. 1-14, the corresponding text, and the examples provide a number of different methods, systems, devices, and non-transitory computer-readable media of the image modification system 106. In addition to the foregoing, one or more embodiments can also be described in terms of flowcharts comprising acts for accomplishing a particular result, as shown in FIGS. 15-17. The acts shown in FIGS. 15-17 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 15-17. In some embodiments, a system can be configured to perform the acts of FIGS. 15-17. Alternatively, the acts of FIGS. 15-17 can be performed as part of a computer-implemented method.

As mentioned above, FIGS. 15-17 illustrate flowcharts of three series of acts 1500, 1600, and 1700, for generating a modified (regularized) noise map of a digital image, an image editing direction, and a modified digital image, respectively, in accordance with one or more embodiments. While FIGS. 15-17 illustrate acts according to one or more embodiments each, alternative embodiments may omit, add to, reorder, and/or modify any acts shown in FIGS. 15-17. Furthermore, as previously mentioned, the methods described herein can be implemented in separate from or in conjunction with one another to generate inverted noise maps, image editing directions, and/or modified digital images.

As shown in FIG. 15, the series of acts 1500 includes an act 1502 of generating a noise map from a source digital image. In particular, in one or more embodiments, the act 1502 includes generating, utilizing a diffusion layer of a diffusion neural network, a noise map from a source digital image.

As shown in FIG. 15, the series of acts 1500 also includes an act 1504 of generating a shifted noise map from the noise map. In particular, in one or more embodiments, the act 1504 includes generating a shifted noise map by shifting the noise map by an offset value. Moreover, in some embodiments, generating the shifted noise map comprises randomly sampling the offset value.

As shown in FIG. 15, the series of acts 1500 also includes an act 1506 of comparing the noise map and the shifted noise map. In particular, in one or more embodiments, the act 1506 includes determining a pairwise correlation loss by comparing one or more regions of the noise map and one or more regions of the shifted noise map. Further, in some embodiments, the act 1506 includes generating a pyramid of noise maps at different resolutions from the noise map, generating a pyramid of shifted noise map at the different resolutions from the shifted noise map, and determining the pairwise correlation loss by comparing the pyramid of noise maps and the pyramid of shifted noise maps.

Moreover, in one or more embodiments, the act 1506 includes determining a pairwise correlation loss by comparing one or more regions of a noise map and one or more regions of a shifted noise map, determining a divergence loss for the noise map relative to a standard distribution, and determining an auto-correlation regularization loss by combining the pairwise correlation loss and the divergence loss. Also, in some embodiments, combining the pairwise correlation loss and the divergence loss comprises weighting the divergence loss by a first weight. Further, in one or more embodiments, combining the pairwise correlation loss and the divergence loss includes weighting the divergence loss by a first weight and weighting the pairwise correlation loss by a second weight. Also, in some embodiments, the act 1506 includes determining the divergence loss of the noise map relative to a zero mean and a unit variance.

As shown in FIG. 15, the series of acts 1500 also includes an act 1508 of generating a modified noise map. In particular, in one or more embodiments, the act 1508 includes generating a modified noise map based on the pairwise correlation loss. Further, in some embodiments, the act 1508 includes modifying the noise map to reduce a similarity metric between the one or more regions of the noise map and the one or more regions of the shifted noise map. Further, in one or more embodiments, the act 1508 includes generating the modified noise map based on an auto-correlation regularization loss.

Moreover, in one or more embodiments, the act 1508 includes generating, utilizing the diffusion layer of the diffusion neural network, the noise map from an initial latent vector corresponding to the source digital image. Further, in some embodiments, inverting the initial latent vector corresponding to the source digital image to generate the noise map comprises utilizing a deterministic forward diffusion model conditioned on a reference encoding of the source digital image. Additionally, in some embodiments, the act 1508 includes generating, utilizing a text encoder, the reference encoding from an image caption describing the source digital image.

Additionally, in one or more embodiments, the series of acts 1500 includes an act (not depicted in FIG. 15) of generating, utilizing one or more subsequent additional diffusion layers of the diffusion neural network, an inversion of the source digital image from the modified noise map, and generating, utilizing a plurality of denoising layers of the diffusion neural network, an additional digital image from the inversion of the source digital image.

Moreover, in one or more embodiments, the series of acts 1500 includes an act (not depicted in FIG. 15) of generating an inversion of the source digital image from the modified noise map utilizing subsequent diffusion layers of the diffusion neural network conditioned by a reference encoding of the source digital image. Further, in some embodiments, the series of acts 1500 includes an act (not depicted in FIG. 15) of generating, utilizing denoising layers of the diffusion neural network, an additional digital image from the inversion of the source digital image. Also, in some embodiments, generating the additional digital image from the inversion comprises conditioning the denoising layers of the diffusion neural network with the reference encoding of the source digital image.

Moreover, in one or more embodiments, the series of acts 1500 includes an act (not depicted in FIG. 15) for generating an additional modified noise map from the modified noise map. In particular, in some embodiments, the series of acts 1500 includes an act of generating, utilizing a subsequent diffusion layer of the diffusion neural network, an additional noise map from the modified noise map, determining an additional pairwise correlation loss by comparing one or more regions of the additional noise map with one or more regions of an additional shifted noise map, and generating an additional modified noise map from the additional noise map based on the additional pairwise correlation loss. In some embodiments, the act for generating the additional shifted noise map includes shifting the additional noise map by an additional offset value different than the offset value of the shifted noise map.

As shown in FIG. 16, the series of acts 1600 includes an act 1602 of generating a first plurality of phrases for a textual identifier. In particular, in one or more embodiments, the act 1602 includes generating, utilizing a language prediction machine learning model, a first plurality of phrases based on a first textual identifier of a source visual feature. Also, in some embodiments, generating the first plurality of phrases comprises determining the first textual identifier for the source visual feature by extracting the source visual feature from a source digital image utilizing a vision-language machine learning model. Moreover, in one or more embodiments, the act 1602 includes identifying the source visual feature within a source digital image and determining the first textual identifier for the source visual feature.

Furthermore, in one or more embodiments, the act 1602 includes determining the first textual identifier for the source visual feature within the source digital image. Also, in some embodiments, determining the first textual identifier comprises generating, utilizing a vision-language machine learning model, an image caption describing the source digital image and identifying the first textual identifier from the image caption.

As shown in FIG. 16, the series of acts 1600 also includes and act 1604 of generating a second plurality of phrases for a second textual identifier. In particular, in one or more embodiments, the act 1604 includes generating, utilizing a language prediction machine learning model, a second plurality of phrases based on a second textual identifier of a target visual feature. Also, in some embodiments, generating the second plurality of phrases comprises determining the target visual feature based on the source visual feature.

Moreover, in one or more embodiments, the act 1604 includes determining the second textual identifier for the target visual feature, the target visual feature comprising an edit to the source visual feature. Also, in some embodiments, determining the second textual identifier comprises receiving natural language input from a client device, the natural language input indicating an edit to the source visual feature.

Furthermore, in one or more embodiments, the act 1604 includes determining the second textual identifier for the target visual feature, the target visual feature comprising an edit to the source visual feature. Also, in some embodiments, determining the second textual identifier comprises receiving, via natural language input from a client device, instructions to edit the source visual feature and analyzing the natural language input to determine the target visual feature and the second textual identifier.

As shown in FIG. 16, the series of acts 1600 also includes and act 1606 of generating embeddings of the first and second pluralities of phrases. In particular, in one or more embodiments, the act 1606 includes generating, utilizing a text encoder, a source embedding of the first plurality of phrases and a target embedding of the second plurality of phrases.

As shown in FIG. 16, the series of acts 1600 also includes and act 1608 of determining an image editing direction by comparing the embeddings. In particular, in one or more embodiments, the act 1608 includes determining an image editing direction between the source visual feature and the target visual feature by comparing the source embedding and the target embedding. Further, in some embodiments, determining the image editing direction between the source visual feature and the target visual feature comprises determining a mean difference between embedded phrases of the source embedding and embedded phrases of the target embedding.

Moreover, in one or more embodiments, the series of acts 1600 includes an act (not depicted in FIG. 16) of receiving, from a client device, a natural language editing input and identifying the source visual feature and the target visual feature from the natural language editing input.

Furthermore, in one or more embodiments, the series of acts 1600 includes an act (not depicted in FIG. 16) of generating, from the image editing direction and a source digital image portraying the source visual feature, a modified digital image portraying the target visual feature utilizing a generative machine learning model. Also, in some embodiments, generating the modified digital image comprises generating, utilizing the text encoder, a caption embedding of an image caption describing the source digital image, creating a caption-image editing direction feature embedding by combining the caption embedding with the image editing direction, and generating the modified digital image portraying the target visual feature from the caption-image editing direction feature embedding utilizing the generative machine learning model. Moreover, in some embodiments, generating the modified digital image portraying the target visual feature utilizing the generative machine learning model comprises generating the modified digital image portraying the target visual feature utilizing a diffusion neural network.

Further, in some embodiments, generating the modified digital image comprises generating, utilizing a vision-language machine learning model, an image caption describing the source digital image, generating, utilizing the text encoder, a caption embedding of the image caption, and generating, utilizing the generative machine learning model, the modified digital image based on the caption embedding and the image editing direction. In addition, in some embodiments, generating the modified digital image based on the caption embedding and the image editing direction comprises combining the caption embedding and the image editing direction with an inversion of the source digital image utilizing a diffusion neural network.

Moreover, in one or more embodiments, the series of acts 1600 includes an act (not depicted in FIG. 16) of generating, utilizing a vision-language machine learning model, an image caption describing a source digital image portraying the source visual feature and generating, utilizing the text encoder, a caption embedding of the image caption. Further, in some embodiments, the series of acts 1600 includes an act (not depicted in FIG. 16) of combining the caption embedding with the image editing direction to create a caption-image editing direction feature embedding and generating, utilizing a diffusion neural network, a modified digital image portraying the target visual feature by combining the caption-image editing direction feature embedding and an inversion of the source digital image.

Further, in some embodiments, generating the modified digital image utilizing the diffusion neural network comprises generating an inversion of the source digital image based on the caption embedding, decoding, utilizing a first channel of the diffusion neural network, the inversion of the source digital image, and generating the modified digital image by decoding, utilizing a second channel of the diffusion neural network, the inversion of the source digital image based on the caption-image editing direction feature embedding with guidance from the decoding by the first channel of the diffusion neural network.

As shown in FIG. 17, the series of acts 1700 includes and act 1702 of generating a reference cross-attention map for an intermediate image reconstruction prediction. In particular, in one or more embodiments, the act 1702 includes generating a reference cross-attention map between a reference encoding of a source digital image and an intermediate image reconstruction prediction generated utilizing a reconstruction denoising layer of a diffusion neural network. Further, in some embodiments, the act 1702 includes generating, utilizing the reconstruction denoising layer of the diffusion neural network, the intermediate image reconstruction prediction by decoding an inversion of the source digital image utilizing the reference encoding.

Furthermore, in one or more embodiments, the act 1702 includes generating, utilizing a text encoder, the reference encoding from an image caption describing the source digital image. Further, in some embodiments, generating the reference encoding comprises generating the image caption for the source digital image utilizing a vision-language machine learning model. Also, in some embodiments, the act 1702 includes generating the reference encoding of the source digital image from an image representation utilizing a conditioning encoder.

Moreover, in one or more embodiments, the act 1702 includes generating, utilizing a reconstruction denoising layer of a diffusion neural network, an intermediate image reconstruction prediction from an inversion of a source digital image and creating a reference cross-attention map between a reference encoding of the source digital image and the intermediate image reconstruction prediction. Further, in some embodiments, generating the intermediate image reconstruction prediction comprises denoising the inversion conditioned on the reference encoding utilizing a conditioning mechanism with the reconstruction denoising layer of the diffusion neural network.

As shown in FIG. 17, the series of acts 1700 also includes and act 1704 of generating an editing cross-attention map for an intermediate edited image prediction. In particular, in one or more embodiments, the act 1704 includes generating an editing cross-attention map between an image editing encoding and an intermediate edited image prediction generated utilizing an image editing denoising layer of the diffusion neural network. Further, in some embodiments, the act 1704 includes generating, utilizing the image editing denoising layer of the diffusion neural network, the intermediate edited image prediction by decoding an inversion of the source digital image utilizing the image editing encoding. Moreover, in one or more embodiments, the act 1704 includes generating the image editing encoding by combining the reference encoding and an image editing direction embedding.

Moreover, in one or more embodiments, the act 1704 includes generating, utilizing an image editing denoising layer of the diffusion neural network, an intermediate edited image prediction from the inversion and an image editing encoding and creating an editing cross-attention map between the image editing encoding and the intermediate edited image prediction.

Also, in one or more embodiments, the act 1704 includes generating, utilizing a language prediction machine learning model, an embedded image editing direction between a source visual feature portrayed within the source digital image and a target visual feature and generating the image editing encoding based on the embedded image editing direction. Further, in some embodiments, generating the image editing encoding comprises combining the embedded image editing direction with a reference encoding generated from an image caption describing the source digital image utilizing a text encoder. Also, in some embodiments, the act 1704 includes generating the image editing encoding by combining the reference encoding with an embedded image editing direction generated utilizing the conditioning encoder.

As shown in FIG. 17, the series of acts 1700 also includes and act 1706 of generating a modified digital image by comparing the reference cross-attention map and the editing cross-attention map. In particular, in one or more embodiments, the act 1706 includes generating a modified digital image, utilizing the diffusion neural network, by comparing the editing cross-attention map and the reference cross-attention map. Further, in some embodiments, generating the modified digital image by comparing the editing cross-attention map and the reference cross-attention map further comprises updating the intermediate edited image prediction to reduce a difference between the editing cross-attention map and the reference cross-attention map.

Furthermore, in one or more embodiments, the act 1706 includes generating a modified intermediate edited image prediction by modifying the intermediate edited image prediction to reduce a difference between the editing cross-attention map and the reference cross-attention map and generating the modified digital image from the modified intermediate edited image prediction utilizing additional denoising layers of the diffusion neural network. Also, in some embodiments, generating the modified digital image further comprises generating, utilizing an additional image editing denoising layer of the additional denoising layers, an additional intermediate edited image prediction from the modified intermediate edited image prediction and generating, utilizing an additional reconstruction denoising layer of the additional denoising layers, an additional intermediate reconstruction prediction from the intermediate reconstruction prediction. In addition, in some embodiments, generating the modified digital image comprises creating an additional reference cross-attention map between the reference encoding and the additional intermediate image reconstruction prediction, creating an additional editing cross-attention map between the image editing encoding and the additional intermediate edited image prediction, and generating the modified digital image by modifying the additional intermediate edited image prediction by comparing the additional editing cross-attention map and the additional reference cross-attention map.

Also, in one or more embodiments, the act 1706 includes generating a modified intermediate edited image prediction by modifying the intermediate edited image prediction to reduce a difference between the editing cross-attention map and the reference cross-attention map, generating, utilizing one or more subsequent denoising layers of the diffusion neural network, one or more subsequent additional intermediate edited image predictions from the modified intermediate edited image prediction, and modifying the one or more subsequent additional intermediate edited image predictions to reduce a difference between one or more subsequent additional reference cross-attention maps and one or more subsequent additional editing cross-attention maps.

Moreover, in one or more embodiments, the series of acts 1700 includes an act (not depicted in FIG. 17) of generating an inversion of the source digital image utilizing diffusion layers of the diffusion neural network. Further, in some embodiments, generating the inversion of the source digital image utilizing the diffusion layer of the diffusion neural network comprises iteratively generating a plurality of subsequent noise maps from the source digital image based on an auto-correlation regularization loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 18:
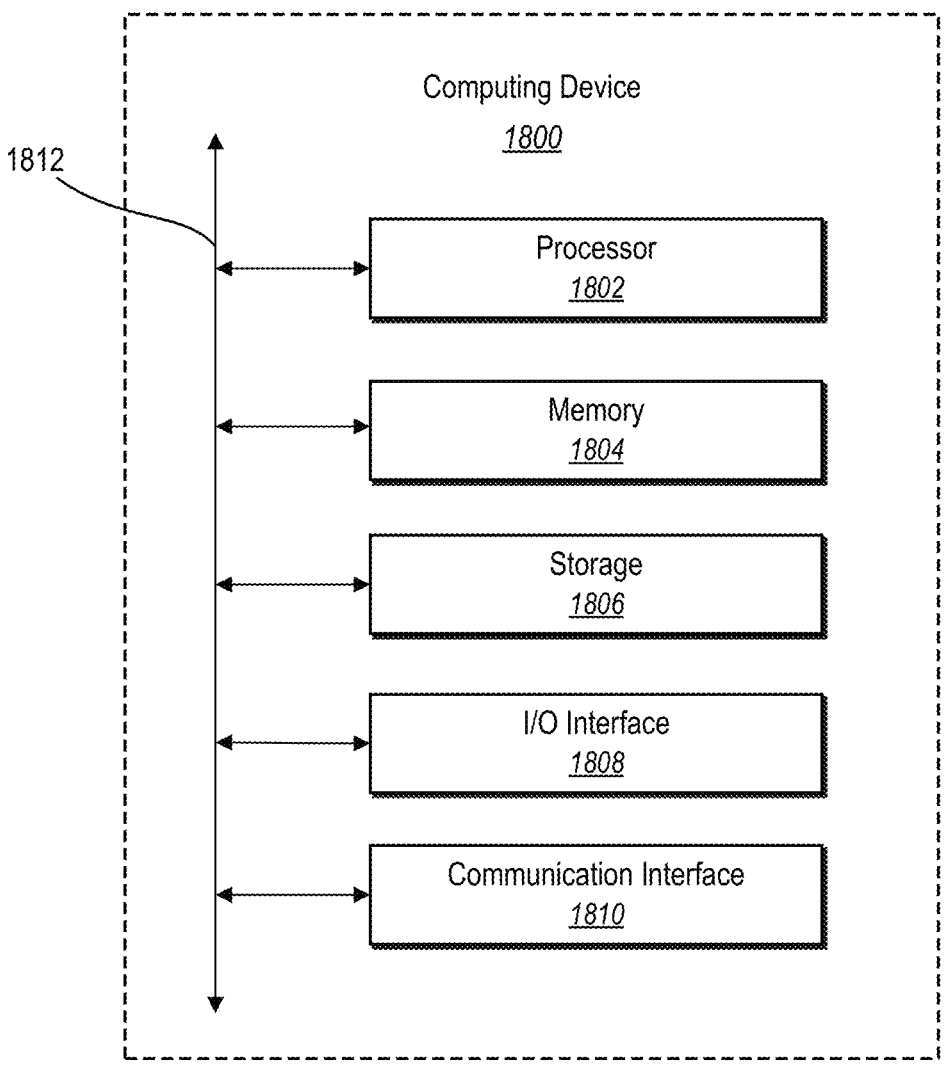
FIG. 18 illustrates a block diagram of an example computing device for implementing one or more embodiments of the present disclosure.

FIG. 18 illustrates a block diagram of an example computing device 1800 that may be configured to perform one or more of the processes described above. One will appreciate that one or more computing devices, such as the computing device 1800 may represent the computing devices described above (e.g., server device(s) 102, client device 112, and computing device 1402). In one or more embodiments, the computing device 1800 may be a mobile device (e.g., a mobile telephone, a smartphone, a PDA, a tablet, a laptop, a camera, a tracker, a watch, a wearable device, etc.). In some embodiments, the computing device 1800 may be a non-mobile device (e.g., a desktop computer or another type of client device). Further, the computing device 1800 may be a server device that includes cloud-based processing and storage capabilities.

As shown in FIG. 18, the computing device 1800 can include one or more processor(s) 1802, memory 1804, a storage device 1806, input/output interfaces 1808 (or "I/O interfaces 1808"), and a communication interface 1810, which may be communicatively coupled by way of a communication infrastructure (e.g., bus 1812). While the computing device 1800 is shown in FIG. 18, the components illustrated in FIG. 18 are not intended to be limiting. Additional or alternative components may be used in other embodiments. Furthermore, in certain embodiments, the computing device 1800 includes fewer components than those shown in FIG. 18. Components of the computing device 1800 shown in FIG. 18 will now be described in additional detail.

In particular embodiments, the processor(s) 1802 includes hardware for executing instructions, such as those making up a computer program. As an example, and not by way of limitation, to execute instructions, the processor(s) 1802 may retrieve (or fetch) the instructions from an internal register, an internal cache, memory 1804, or a storage device 1806 and decode and execute them.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1804 may be internal or distributed memory.

The computing device 1800 includes a storage device 1806 includes storage for storing data or instructions. As an example, and not by way of limitation, the storage device 1806 can include a non-transitory storage medium described above. The storage device 1806 may include a hard disk drive (HDD), flash memory, a Universal Serial Bus (USB) drive or a combination these or other storage devices.

As shown, the computing device 1800 includes one or more I/O interfaces 1808, which are provided to allow a user to provide input to (such as user strokes), receive output from, and otherwise transfer data to and from the computing device 1800. These I/O interfaces 1808 may include a mouse, keypad or a keyboard, a touch screen, camera, optical scanner, network interface, modem, other known I/O devices or a combination of such I/O interfaces 1808. The touch screen may be activated with a stylus or a finger.

The I/O interfaces 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1808 are configured to provide graphical data to a display for presentation to a user. The graphical data may be representative of one or more graphical user interfaces and/or any other graphical content as may serve a particular implementation.

The computing device 1800 can further include a communication interface 1810. The communication interface 1810 can include hardware, software, or both. The communication interface 1810 provides one or more interfaces for communication (such as, for example, packet-based communication) between the computing device and one or more other computing devices or one or more networks. As an example, and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI. The computing device 1800 can further include a bus 1812. The bus 1812 can include hardware, software, or both that connects components of computing device 1800 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a language prediction machine learning model, for a digital image:
a first plurality of phrases based on a first textual identifier of a source visual feature of the digital image, the first plurality of phrases comprising the first textual identifier; and
a second plurality of phrases based on a second textual identifier of a target visual feature, the second plurality of phrases comprising the second textual identifier;
generating, utilizing a text encoder, a source embedding of the first plurality of phrases comprising the first textual identifier and a target embedding of the second plurality of phrases comprising the second textual identifier; and
determining an image editing direction between the source visual feature and the target visual feature by comparing the source embedding of the first plurality of phrases comprising the first textual identifier and the target embedding of the second plurality of phrases comprising the second textual identifier.

2. The computer-implemented method of claim 1, wherein generating the first plurality of phrases comprises determining the first textual identifier for the source visual feature by extracting the source visual feature from a source digital image utilizing a vision-language machine learning model.

3. The computer-implemented method of claim 1, wherein generating the second plurality of phrases comprises determining the target visual feature based on the source visual feature.

4. The computer-implemented method of claim 1, further comprising:
receiving, from a client device, a natural language editing input; and
identifying the source visual feature and the target visual feature from the natural language editing input.

5. The computer-implemented method of claim 1, wherein determining the image editing direction between the source visual feature and the target visual feature comprises determining a mean difference between embedded phrases of the source embedding and embedded phrases of the target embedding.

6. The computer-implemented method of claim 1, further comprising generating, from the image editing direction and a source digital image portraying the source visual feature, a modified digital image portraying the target visual feature utilizing a generative machine learning model.

7. The computer-implemented method of claim 6, further comprising:
generating, utilizing the text encoder, a caption embedding of an image caption describing the source digital image;
creating an image editing encoding by combining the caption embedding with the image editing direction; and
generating the modified digital image portraying the target visual feature from the image editing encoding utilizing the generative machine learning model.

8. The computer-implemented method of claim 6, wherein generating the modified digital image portraying the target visual feature utilizing the generative machine learning model comprises generating the modified digital image portraying the target visual feature utilizing a diffusion neural network.

9. A system comprising:
one or more memory devices; and
one or more processors coupled to the one or more memory devices that cause the system to perform operations comprising:
determining a first textual identifier for a source visual feature within a source digital image;
determining a second textual identifier for a target visual feature, the target visual feature comprising an edit to the source visual feature;
generating, utilizing a language prediction model, for the source digital image:
a first plurality of phrases based on the first textual identifier, the first plurality of phrases comprising the first textual identifier, and
a second plurality of phrases based on the second textual identifier, the second plurality of phrases comprising the second textual identifier;
generating, utilizing a text encoder, a source embedding of the first plurality of phrases comprising the first textual identifier and a target embedding of the second plurality of phrases comprising the second textual identifier; and
determining an image editing direction between the source visual feature and the target visual feature by comparing the source embedding of the first plurality of phrases comprising the first textual identifier and the target embedding of the second plurality of phrases comprising the second textual identifier.

10. The system of claim 9, wherein determining the second textual identifier comprises:
receiving, via natural language input from a client device, instructions to edit the source visual feature; and
analyzing the natural language input to determine the target visual feature and the second textual identifier.

11. The system of claim 9, wherein determining the first textual identifier comprises:
generating, utilizing a vision-language machine learning model, an image caption describing the source digital image; and
identifying the first textual identifier from the image caption.

12. The system of claim 9, wherein the operations further comprise generating, utilizing a generative machine learning model, a modified digital image portraying the target visual feature from the image editing direction and the source digital image.

13. The system of claim 12, wherein generating the modified digital image comprises:

generating, utilizing a vision-language machine learning model, an image caption describing the source digital image;

generating, utilizing the text encoder, a caption embedding of the image caption; and generating, utilizing the generative machine learning model, the modified digital image based on the caption embedding and the image editing direction.

14. The system of claim 13, wherein generating the modified digital image based on the caption embedding and the image editing direction comprises combining the caption embedding and the image editing direction with an inversion of the source digital image utilizing a diffusion neural network.

15. A non-transitory computer readable medium storing instructions thereon that, when executed by at least one processor, cause the at least one processor to perform operations comprising:

generating, utilizing a language prediction model, for a digital image:

a first plurality of phrases based on a first textual identifier of a source visual feature of the digital image, the first plurality of phrases comprising the first textual identifier; and a second plurality of phrases based on a second textual identifier of a target visual feature, the second plurality of phrases comprising the second textual identifier;

generating, utilizing a text encoder, a source embedding of the first plurality of phrases comprising the first textual identifier and a target embedding of the second plurality of phrases comprising the second textual identifier; and determining an image editing direction between the source visual feature and the target visual feature by comparing the source embedding of the first plurality of phrases comprising the first textual identifier and the target embedding of the second plurality of phrases comprising the second textual identifier.

16. The non-transitory computer readable medium of claim 15, wherein the operations further comprise:

identifying the source visual feature within a source digital image;

determining the first textual identifier for the source visual feature; and determining the second textual identifier for the target visual feature, the target visual feature comprising an edit to the source visual feature.

17. The non-transitory computer readable medium of claim 15, wherein determining the second textual identifier comprises receiving natural language input from a client device, the natural language input indicating an edit to the source visual feature.

18. The non-transitory computer readable medium of claim 15, wherein the operations further comprise:

generating, utilizing a vision-language machine learning model, an image caption describing a source digital image portraying the source visual feature; and generating, utilizing the text encoder, a caption embedding of the image caption.

19. The non-transitory computer readable medium of claim 18, wherein the operations further comprise:

combining the caption embedding with the image editing direction to create an image editing encoding; and generating, utilizing a diffusion neural network, a modified digital image portraying the target visual feature by combining the image editing encoding and an inversion of the source digital image.

20. The non-transitory computer readable medium of claim 19, wherein generating the modified digital image utilizing the diffusion neural network comprises:

generating an inversion of the source digital image based on the caption embedding;

denoising, utilizing a first channel of the diffusion neural network, the inversion of the source digital image; and generating the modified digital image by denoising, utilizing a second channel of the diffusion neural network, the inversion of the source digital image based on the image editing encoding with guidance from the denoising by the first channel of the diffusion neural network.

\* \* \* \* \*